United States Patent
Senarath et al.

(10) Patent No.: US 10,740,864 B2
(45) Date of Patent: *Aug. 11, 2020

(54) SYSTEMS, DEVICES AND METHODS FOR DISTRIBUTED CONTENT PRE-FETCHING TO A USER DEVICE

(71) Applicants: Nimal Gamini Senarath, Ottawa (CA); Alex Stephenne, Stittsville (CA); Philippe Leroux, Ottawa (CA); Mehdi Arashmid Akhavain Mohammadi, Ottawa (CA); Aaron James Callard, Ottawa (CA)

(72) Inventors: Nimal Gamini Senarath, Ottawa (CA); Alex Stephenne, Stittsville (CA); Philippe Leroux, Ottawa (CA); Mehdi Arashmid Akhavain Mohammadi, Ottawa (CA); Aaron James Callard, Ottawa (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 16/137,922

(22) Filed: Sep. 21, 2018

(65) Prior Publication Data

US 2019/0026852 A1    Jan. 24, 2019

Related U.S. Application Data

(63) Continuation of application No. 14/610,139, filed on Jan. 30, 2015, now Pat. No. 10,083,494.

(51) Int. Cl.
*H04L 29/06* (2006.01)
*G06Q 90/00* (2006.01)
(Continued)

(52) U.S. Cl.
CPC ....... *G06Q 90/00* (2013.01); *G08G 1/096716* (2013.01); *G08G 1/096775* (2013.01);
(Continued)

(58) Field of Classification Search
CPC ............ G06Q 90/00; G08G 1/096716; G08G 1/096775; H04L 45/48; H04W 40/20; H04W 40/04; H04W 88/02; H04W 84/12
See application file for complete search history.

(56) References Cited

U.S. PATENT DOCUMENTS

| 7,043,514 B1 | 5/2006 | Achlioptas | |
| 8,195,134 B2 * | 6/2012 | Onishi | H04W 4/021 455/414.1 |

(Continued)

FOREIGN PATENT DOCUMENTS

| CN | 1953571 A | 4/2007 |
| CN | 101803300 A | 8/2010 |

(Continued)

OTHER PUBLICATIONS

Dimitrios Lymberopoulos, Peixiang Zhao, Arnd Christian Konig, Klaus Berberich, and Jie Liu, Location-aware Click Prediction in Mobile local Search, in Conference in Information and Knoweledge Management (CIKM), ACM, 2011.

(Continued)

*Primary Examiner* — Phuc H Tran

(57) ABSTRACT

There is disclosed a system for transmitting data to users. The system includes nodes interconnected by at least one data network. The nodes are organized hierarchically to comprise a root node and at least two child nodes. The data transmission characteristics of communication with each of the child nodes are different. The root node is configured to: receive data transmission preferences of a particular user; receive data to be transmitted to the particular user; and (Continued)

transmit a selected subset of the data to at least one of the child nodes. The subset selected based on at least the received data transmission preferences and the data transmission characteristics, to permit the particular user to obtain data from the child nodes according to the data transmission preferences. The at least one of the child nodes being configured to: receive data from the root node; and transmit at least part of the received data to the user.

19 Claims, 10 Drawing Sheets

(51) Int. Cl.
*G08G 1/0967* (2006.01)
*H04W 88/02* (2009.01)
*H04W 84/12* (2009.01)
*H04W 40/04* (2009.01)
*H04W 40/20* (2009.01)
*H04L 12/753* (2013.01)

(52) U.S. Cl.
CPC ............ *H04L 45/48* (2013.01); *H04W 40/04* (2013.01); *H04W 40/20* (2013.01); *H04W 84/12* (2013.01); *H04W 88/02* (2013.01)

(56) References Cited

U.S. PATENT DOCUMENTS

| | | | |
|---|---|---|---|
| 8,516,114 B2 * | 8/2013 | Banavar | H04L 29/06 709/225 |
| 8,532,127 B2 | 9/2013 | Kompella | |
| 8,849,731 B2 * | 9/2014 | Lymberopoulos | G06F 16/9574 706/12 |
| 9,277,365 B1 * | 3/2016 | Wilden | H04W 4/029 |
| 9,461,980 B1 * | 10/2016 | Agrawal | H04L 63/08 |
| 2003/0065712 A1 * | 4/2003 | Cheung | H04L 29/06 709/203 |
| 2004/0264462 A1 | 12/2004 | Bardalai | |
| 2007/0085900 A1 | 4/2007 | Dautun et al. | |
| 2008/0069099 A1 | 3/2008 | Tani | |
| 2008/0205394 A1 | 8/2008 | Deshpande | |
| 2008/0310311 A1 | 12/2008 | Flames et al. | |
| 2009/0307336 A1 | 12/2009 | Hieb | |
| 2009/0326810 A1 | 12/2009 | Callaghan et al. | |
| 2011/0054793 A1 | 3/2011 | Harada et al. | |
| 2011/0219280 A1 | 9/2011 | Blumrich | |
| 2012/0030554 A1 * | 2/2012 | Toya | H04N 7/17318 715/206 |
| 2012/0047445 A1 | 2/2012 | Rajagopal | |
| 2012/0077522 A1 * | 3/2012 | Mate | H04N 21/2187 455/456.3 |
| 2012/0139754 A1 | 6/2012 | Ginsberg et al. | |
| 2013/0028143 A1 | 1/2013 | Vasseur | |
| 2013/0243038 A1 | 9/2013 | Rasband | |
| 2014/0122673 A1 | 5/2014 | Shaffer | |
| 2014/0286165 A1 | 9/2014 | Chowdhury | |
| 2014/0365732 A1 | 12/2014 | Sivasubramanian | |
| 2015/0189038 A1 | 7/2015 | Nourse | |
| 2016/0021508 A1 | 1/2016 | Dunkin | |
| 2016/0217377 A1 | 7/2016 | Senarath | |
| 2016/0226995 A1 | 8/2016 | Senarath | |
| 2017/0085670 A1 | 3/2017 | Senarath et al. | |

FOREIGN PATENT DOCUMENTS

| | | |
|---|---|---|
| CN | 107113558 A | 8/2017 |
| EP | 1544574 A1 | 6/2005 |
| EP | 2658211 A1 | 10/2013 |
| WO | 2008120164 A2 | 10/2008 |
| WO | 2013073297 A1 | 5/2013 |
| WO | 2013109472 A1 | 7/2013 |

OTHER PUBLICATIONS

Dimitrios Lymberopoulos, Oriana Riva, Karin Strauss, Akshay Mittal, and Alexandros Ntoulas, PocketWeb: Instant Web Browsing for Mobile Devices, in Architectural Support for Programming Languages and Operating Systems (ASPLOS 2012), ACM, Mar. 2012.
Emmanouil Koukoumidis, Dimitrios Lymberopoulos, Karin Strauss, Jie Liu, and Doug Burger, Pocket Cloudlets, in International Conference on Architectural Support for Programming Languages and Operating Systems (ASPLOS 2011), ACM, Mar. 2011.
Query Mobile Docs, Pre-fetching and caching pages, http://demos.jquerymobile.com/1.2.0/docs/pages/page-cache.html#1.2.0/docs/pages/page-anatomy.html.
Parate, Abhinav et al., Practical Prediction and Prefetch for Faster Access to Applications on Mobile Phones, in ACM International Joint Conference on Pervasive and Ubiquitous Computing (UbiComp 2013), Sep. 2013.
Wu, Shiow-yang et al., Headlight Prefetching and Dynamic Chaining for Cooperative Media Streaming in Mobile Environments, IEEE Transactions on Mobile Computing, vol. 8, No. 2, Feb. 2009.
Ali, Waleed et al., A Survey of Web Caching and Prefetching, Int. J. Advance. Soft Comput. Appl., vol. 3, No. 1, Mar. 2011.
FollowThatPage: http://www.followthatpage.com/.
Change Detection: http://www.changedetection.com/.
Siris, Vasilios A. et al., Improving Mobile Video Streaming with Mobility Prediction and Prefetching in Integrated Cellular-WiFi Networks, Lecture Notes of the Institute for Computer Sciences, Social Informatics and Telecommunications Engineering vol. 131, 2014, pp. 699-704.
Deshpande, Pralhad et al., Predictive Methods for Improved Vehicular WiFi Access, Proceedings of the 7th international conference on Mobile systems, applications, and services (MobiSys '09), ACM, Jun. 2009.
Search Report and Written Opinion issued in International Application No. PCT/IB2015/058790 filed Nov. 13, 2015.

* cited by examiner

SYSTEMS, DEVICES AND METHODS FOR DISTRIBUTED CONTENT PRE-FETCHING TO A USER DEVICE

CROSS REFERENCE TO RELATED APPLICATIONS

This application is a continuation of U.S. patent application Ser. No. 14/610,139 filed Jan. 30, 2015, which is incorporated by reference herein in its entirety.

FIELD

This relates to data communications, and more particularly, to content pre-fetching in data communication systems.

BACKGROUND

In recent years, access to wireless data communication has proliferated. For example, coverage of mobile telecommunication networks (e.g., 3G, 4G, LTE, etc.) and WiFi networks has steadily expanded. This has created an expectation, in some users, of continuous and instant wireless connectivity, and being able to access content by way of wireless data communication at all times. However, despite advances in wireless data communication, many wireless and backhaul access links are unreliable, low-rate, or high latency, and many coverage gaps still exist. As a result, users may fail to obtain content data when desired.

Pre-fetching of content data has been employed to improve Quality of Experience to users in various aspects. For example, content data may be pre-fetched from remote content sources to a mobile device. However, if the network links between the mobile device and the remote content sources are unreliable or low-rate, then the content data may not be retrieved in time. Even further, the links between the mobile device and the remote content sources may be costly.

Accordingly, there exists a need for systems, devices, and methods that address at least some of the above-noted shortcomings.

SUMMARY

In an aspect, there is provided a system for transmitting data to users. The system includes a plurality of nodes interconnected by at least one data network. The plurality of nodes is organized hierarchically to comprise a root node and at least two child nodes, wherein data transmission characteristics of communication with each of the child nodes are different. The root node is configured to: receive data transmission preferences of a particular user; receive data to be transmitted to the particular user; and transmit a selected subset of the data to at least one of the child nodes. The subset is selected based on at least the received data transmission preferences and the data transmission characteristics, to permit the particular user to obtain data from the child nodes according to the data transmission preferences. The at least one of the child nodes being configured to: receive data from the root node; and transmit at least part of the received data to the user.

The data transmission preferences may be cost preferences.

The cost preferences may relate to a network cost.

The cost preferences may relate to a monetary cost.

The data to be transmitted to the particular user may include data pre-fetched for the particular user.

The data pre-fetched for the particular user may include data pre-fetched from an original content source.

The data pre-fetched for the particular user may include data pre-fetched from a content cache.

The root node may be configured to divide content into subsets based on capacity limits of the at least one data network or at least one of the child nodes.

The root node may be configured to: receive, from the particular user, an indicator of data stored at a user device that does not need to be transmitted to the particular user.

The data transmission characteristics may include at least one of: a data rate, latency, capacity, load, congestion state, and cost.

The root node may be configured to select the at least one of the child nodes to receive the subset of data based on the data transmission characteristics.

The root node may be configured to receive a request for particular data.

The request for particular data may be transmitted through the at least one data network by way of a high-cost link.

The root node may be configured to determine data characteristics of the received data; and select the subset of data based on at least the determined data characteristics.

The data characteristics may include comprise at least one of: an urgency, a size, and an associated application.

The root node may determine when particular data at a content source has changed, and in response, retrieves the particular data.

In another aspect, there is provided a method for transmitting data to users. The method includes, at a parent node interconnected by a at least one data network with at least two child nodes, wherein data transmission characteristics of communication with each of the child nodes are different: receiving data transmission preferences for a particular user; receiving data to be transmitted to the particular user; and transmitting a selected subset of the received data to at least one of the child nodes. The subset is selected based on at least the received data transmission preferences and the data transmission characteristics, to permit the particular user to obtain data from the child nodes according to the data transmission preferences. The method also includes, at the at least one of the child nodes: receiving data from the parent node; and transmitting at least part of the received data to the user.

In a further aspect, there is provided a method at a parent node for transmitting data to a user by way of at least two child nodes, wherein data transmission characteristics of communication with each of the child nodes are different. The method includes: receiving data transmission preferences for a particular user; receiving data to be transmitted to the particular user; and transmitting a selected subset of the received data to at least one of the child nodes, the subset selected based on at least the received data transmission preferences and the data transmission characteristics, to permit the particular user to obtain data from the child nodes according to the data transmission preferences.

In yet another aspect, there is provided a device including: memory for storing data transmission preferences; a network interface for interconnecting the device with a plurality of nodes organized hierarchically to comprise a root node and at least two child nodes, wherein the data transmission characteristics for communication with each of the child nodes are different. The device also includes at least one processor in communication with the memory at the network interface configured to: transmit a data transmission preference to the root node; and receive a data transmission from a particular one of the child nodes, the data transmission satisfying the data transmission preference.

Many further features and combinations thereof concerning the present improvements will appear to those skilled in the art following a reading of the instant disclosure.

DESCRIPTION OF THE FIGURES

In the figures.

These drawings depict exemplary embodiments for illustrative purposes, and variations, alternative configurations, alternative components and modifications may be made to these exemplary embodiments.

DETAILED DESCRIPTION

Figure 1:
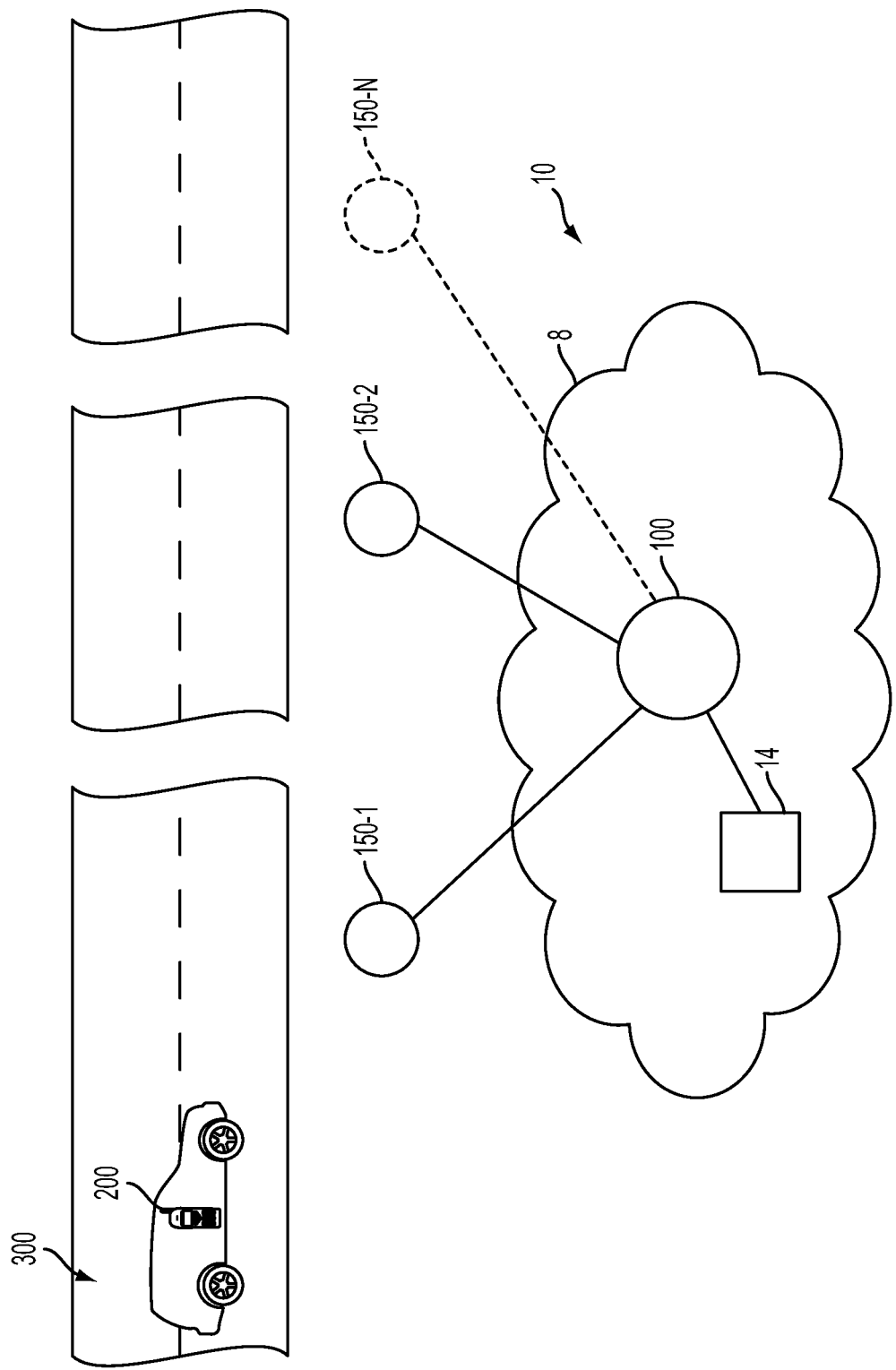
FIG. 1 is a schematic diagram of a data communication system including root nodes and child nodes, exemplary of an embodiment.

FIG. 1 illustrates a data communication system 10 that performs per-user content pre-fetching.

System 10 performs content pre-fetching to a user's mobile device using a distributed set of nodes interconnected by one or more data communication networks. The set of nodes includes nodes distributed geographically at locations proximate predicted future locations of a particular user. For example, the set of nodes may include nodes located along a travel route predicted for a particular user.

In an aspect, multiple nodes may each perform user mobility prediction, and nodes closer to the user may produce more accurate or more timely predictions, as detailed below. Such predictions may be shared amongst the nodes, e.g., to facilitate content interest prediction.

In an aspect, these nodes and the user's mobile device cooperate in manners detailed herein to perform content pre-fetching, and to distribute pre-fetched content data amongst the nodes such that at least parts of content data are available at a node proximate the user as the user moves from location to location.

The pre-fetched content data may be transmitted from one of the distributed nodes to the particular user's mobile device for immediate or future consumption.

The pre-fetched content data made available at each node may be tailored to suit a predicted situation of the user when proximate that node, e.g., activities being performed, applications being executed, etc.

The pre-fetched content data made available at each node may also be tailored based on data transmission characteristics associated with available nodes as detailed below. Such data transmission characteristics may include, for example, transmission costs, data rate, capacity, latency, etc. Transmission costs may include monetary and non-monetary costs. Monetary costs may include, for example, costs associated with gaining accessing particular nodes, particular networks, or particular content sources, per-unit data transfer costs, roaming costs, etc. Non-monetary costs may include, for example, network costs associated with increased loads on particular nodes, links, etc.

The pre-fetched content data made available at each node may also be tailored based on data transmission preferences of the user, a user agent or an application executing at the user's mobile device. Such preferences may, for example, relate to when data is required, data transmission latency, tolerance for transmission costs. In an embodiment, preferences may identify a particular child node, a particular access point, a particular network link, or the like, through which data should be transmitted. Such preferences may be expressed, for example, for particular types of traffic, particular applications, or particular user situations (e.g., whether the user is at work or at home).

As will be detailed herein, such preferences may be applied to data downloaded from the nodes (e.g., pre-fetched data stored at the nodes), or data to be uploaded through the nodes (e.g., control data, content requests, etc.).

Data reflecting such preferences may be transmitted from a user's mobile device to central root node, where it may be processed when transmitting pre-fetched data to child nodes closer to a mobile device, as detailed below. Data reflecting such preferences may also be transmitted to one or more network controllers responsible for routing traffic.

Distributing pre-fetched content data to nodes proximate predicted future locations for a particular user facilitates ready access by the user's mobile device to at least some of the content data, even when the device's network connectivity may be limited, e.g., when the links to content sources may be unreliable or low-rate.

Conveniently, in an embodiment, pre-fetched content data may be distributed to nodes such that preferences of the user or the user's applications are considered, and at least some of such preferences may be satisfied.

In another aspect, the nodes of system 10 and the user's mobile device may cooperate in manners detailed herein to perform per-user content interest prediction to identify content expected to be of interest to particular mobile device users, and to distribute a list of content expected to be of interest to a particular user amongst the nodes.

In yet another aspect, the nodes of system 10 and the user's mobile device may cooperate in manners detailed herein to perform content discovery to find locations of content identified in a content list. For example, multiple nodes and/or the user's mobile device may each search for a closest location of content. In this way, content data may be retrieved from a preferred location (e.g., closest to the user, or a location having a lower access cost), which may vary as the user moves from location to location. For example, the nodes of system 10 or the user's mobile device may pre-fetch content from such a preferred location, as found.

In the example embodiment depicted in FIG. 1, system 10 performs content pre-fetching for a particular user operating a mobile device 200 who is traveling along route 300. As depicted, system 10 includes a root node 100 interconnected with a plurality of child nodes, e.g., nodes 150-1, 150-2, 150-N, and so on, hereinafter referred to collectively as child nodes 150. Root node 100 is also interconnected with one or more content sources 14. Content sources 14 may be original content sources or content caches.

As detailed herein, in an embodiment root node 100 pre-fetches content data from the one or more content sources 14. Root node 100 then forwards the pre-fetched content data to particular child nodes proximate predicted future locations of the user. Mobile device 200 may then pre-fetch the data or retrieve the data when needed from those child nodes.

In an embodiment, a set of such nodes (e.g., root node 100 and child nodes 150) is instantiated for each particular user, to perform per-user content pre-fetching in manners detailed herein. In this embodiment, each set of nodes is dedicated to the particular user, and serves only that particular user.

Root node 100, child nodes 150, and content sources 14 are interconnected by one or more data communication networks 8. Networks 8 may include a packet-switched network, a circuit-switched network, or a combination thereof. Networks 8 may include wired links, wireless links, or a combination thereof. Networks 8 may include wired access points and wireless access points. Networks 8 may include or be connected to the Internet.

In the depicted embodiment, root node 100 is located in the cloud, where it may be interconnected to one or more content sources 14. The links between root node 100 and one or more of the plurality of content sources may have deficiencies such as, e.g., low data rate, high latency, etc. Root node 100 may pre-fetch content data from one or more of such content sources. Further, content sources 14 may require authorization to access any content.

Conveniently, pre-fetching according to the depicted embodiment may improve Quality of Experience for the user, and particularly in the presence of such link deficiencies. Further, pre-fetching in combination with pre-authorization as described below for the depicted embodiment may allow certain delays associated with establishing authorized connections to be avoided.

Root node 100 maintains a content list for the particular user. The content list includes a plurality of entries, each identifying a content item expected to be of interest to the user. Root node 100 may populate the content list, for example, based on content interests predicted for the particular user. Root node 100 may also populate the content list, for example, based on content interests expressed by the particular user or indicated by an application executing at the user's mobile device 200. Root node 100 updates the list as new content interest predictions are made, and new content interests are received.

Root node 100 may pre-fetch content data according to content identified in this content list. Root node 100 may assign priorities to portions of content data, for example, based on a user mobility prediction, a likelihood that the user will access the content data at a particular location, e.g., from a particular child node, data transmission preferences, etc. Conveniently, in some cases, assigning priorities to portions of the content data, and distributing portions of the content data according to those priorities improves the utilization of network resources. For example, high priority content data may be pre-fetched at a node first, to make that content data available to the user in the face of network congestion, link deficiencies, or storage limitations at a node or at mobile device 200.

Child nodes 150 are distributed geographically at locations proximate predicted future locations of a particular user. In the example embodiment depicted in FIG. 1, child nodes 150 are located along a predicted travel route 300 of the user. In this embodiment, the user is expected to be proximate child node 150-1 at time $T_1$, proximate child node 150-2 at time $T_2$, proximate child node 150-N at time $T_N$, and so on. A child node 150 may, for example, be located at an edge of a wireless networks with which device 200 has connectivity at a particular point in time.

In the depicted embodiment, child nodes 150 are instantiated by system 10 at desired locations proximate the predicted future locations of the user. For example, a root node 100 may cause a new child node 150 to be instantiated by selecting a desired geographic location for the new node, and then transmitting a request to a device at the selected geographic location to function as the new node. Child nodes 150 may be instantiated as predictions of the future locations become available, and prior to the user's arrival at those locations. For example, child node 150-N (shown in dotted lines) may not exist at time $T_1$, but may be instantiated by system 10 at $T_{N-1}$. System 10 may remove any of child nodes 150 once it is no longer required, e.g., once a user has traveled out of the range of the child node 150, or if the predicted future locations are determined to be incorrect. Thus, each of child nodes 150 may exist only temporarily. In this way, a set of child nodes 150 may migrate with a particular user as that user moves from location to location.

In another embodiment, a plurality of child nodes 150 may be provided at a plurality of locations, e.g., to span a geographic area, before any predictions of a user's future location are made.

Child nodes 150 may be located in different wireless networks, e.g., in different jurisdictions, operated by different service providers, or configured to communicate with mobile devices by way of different Radio Access Technology (RAT), e.g., WiFi, 3G, 4G, LTE, etc.

Each child node 150 may maintain its own content list. The content list maintained at a child node 150 may be a subset of the content list maintained at root node 100 or at device 200. The subset may be selected based on content expected to be of interest to the user when the user is proximate a respective child node 150.

Each child node 150 may store pre-fetched content data for future transmission to mobile device 200. The pre-fetched content data stored at a child node 150 may include data pre-fetched at root node 100 and received therefrom. The pre-fetched content data stored at a child node 150 may also include data pre-fetched at that child node 150. Each child node 150 may pre-fetch content according to content identified in its own content list. Each child node 150 may also pre-fetch content upon receiving a request, for example, from root node 100 or mobile device 200.

The pre-fetched content data stored at each child node 150 is data expected to be needed at mobile device 200 when the user is proximate that child node 150. So, for example, the pre-fetched content data stored at child node 150-1 includes content data expected to be needed at mobile device 200 at time $T_1$; the pre-fetched content data stored at child node 150-2 includes content data expected to be needed at mobile device 200 at time $T_2$; the pre-fetched content data stored at child node 150-N includes content data expected to be needed at mobile device 200 at time $T_N$, and so on. The content data expected to be needed at mobile device 200 at a particular time are determined based on predictions of the user's situation at that time, e.g., location, activities being performed, applications being executed, etc., as detailed below.

The pre-fetched content data at each child node 150 may also depend on its data transmission characteristics and on any data transmission preferences of a user or a particular application executing at mobile device 200.

For example, each child node 150 may be classified into a particular type based on its data transmission characteristics, e.g., capacity, data rates, transmission costs. This classification may also take into account data transmission characteristics of any backhaul links of the child node 150, e.g., capacity, data rates, access costs of those backhaul links. The classification may also take into account data transmission characteristics of any access points used by the user to access the child node 150, e.g., capacity, data rates, transmission costs of those access points.

In one specific example, a child node 150 may be classified as a "Type A" node when it has one or more of the following characteristics: high capacity, high data rate, good backhaul link, and low access cost. A child node 150 may be classified as a "Type A" node, for example, when it resides in a WiFi network or when it is coupled to a picocell base station. In another specific example, a child node 150 may be classified as a "Type B" node when it has one or more of the following characteristics: low capacity, low data rate, limited/overloaded backhaul link, and high access cost. A child node 150 may be classified as a "Type B" node, for example, when it uses vehicle-to-vehicle relayed data transmission, or when it is coupled to a macrocell base station.

In one example, urgent or small pieces of data may be pre-fetched at a Type B child node 150 for transmission to mobile device 200. Such data may include, for example, data indicating the up-to-date status of content data stored at device 200, control data for establishing authorized connections between device 200 and remote servers, financial trading data, etc. In another example, non-urgent or large pieces of data may be pre-fetched at Type A child node 150 for transmission to the mobile device 200. Such data may include, for example, audio/video data, long-term weather forecasts, etc.

As noted, the particular child node 150 to be used may also depend on data transmission preferences, as may be indicated by the user of device 200, a user agent or by a particular application executing at mobile device 200.

For example, data transmission preferences may include a preference that certain content should be forward to device 200 irrespective of costs, or that certain content should be forwarded irrespective of costs for certain predicted user situations. So, the preferences may specify that some data (e.g., control data or content requests) may be transmitted even through high-cost or low data rate links (e.g. through a macrocell base station). Thus, routing and scheduling of pre-fetch data may accommodate the user's data transmission preferences.

Conveniently, in the depicted embodiment, because the pre-fetched content data stored at each of child nodes 150-1 and 150-2 may be controlled and allocated by root node 100, content data may be supplied to mobile device 200 without user perceivable interruption as the user moves out of the range of child node 150-1 and into the range of child node 150-2.

In the absence of control provided by root node 100 in manners described herein, data may be pre-fetched (e.g., at multiple nodes) unnecessarily. For example, in one example conventional system, when a user moves from a first access point to a second access point, all of the pre-fetched content stored at the first access point may need to be downloaded again at the second access point.

Further, in the depicted embodiment, even though child nodes 150-1 and 150-2 may be in two wireless networks, pre-fetched content data may be provided without user perceivable interruption to mobile device 200 even when the device transitions from one wireless network to another. Similarly, even though child nodes 150-1 and 150-2 may use different RAT, pre-fetched content data may be provided to mobile device 200 without user perceivable interruption even when the device transitions from RAT to another.

Mobile device 200 is a mobile phone or another type of mobile device (e.g., a tablet computer or a laptop computer). Device 200 includes one or more communication interfaces allowing the device to access data communication networks by way of one more RAT.

Device 200 communicates with one or more of child nodes 150, e.g., to receive pre-fetched content data from a child node 150 and to upload data to a child node 150. In an embodiment, device 200 communicates with child nodes 150 directly. In another embodiment, device 200 communicates with child nodes 150 indirectly, e.g., by way of wireless access points.

Figure 2:
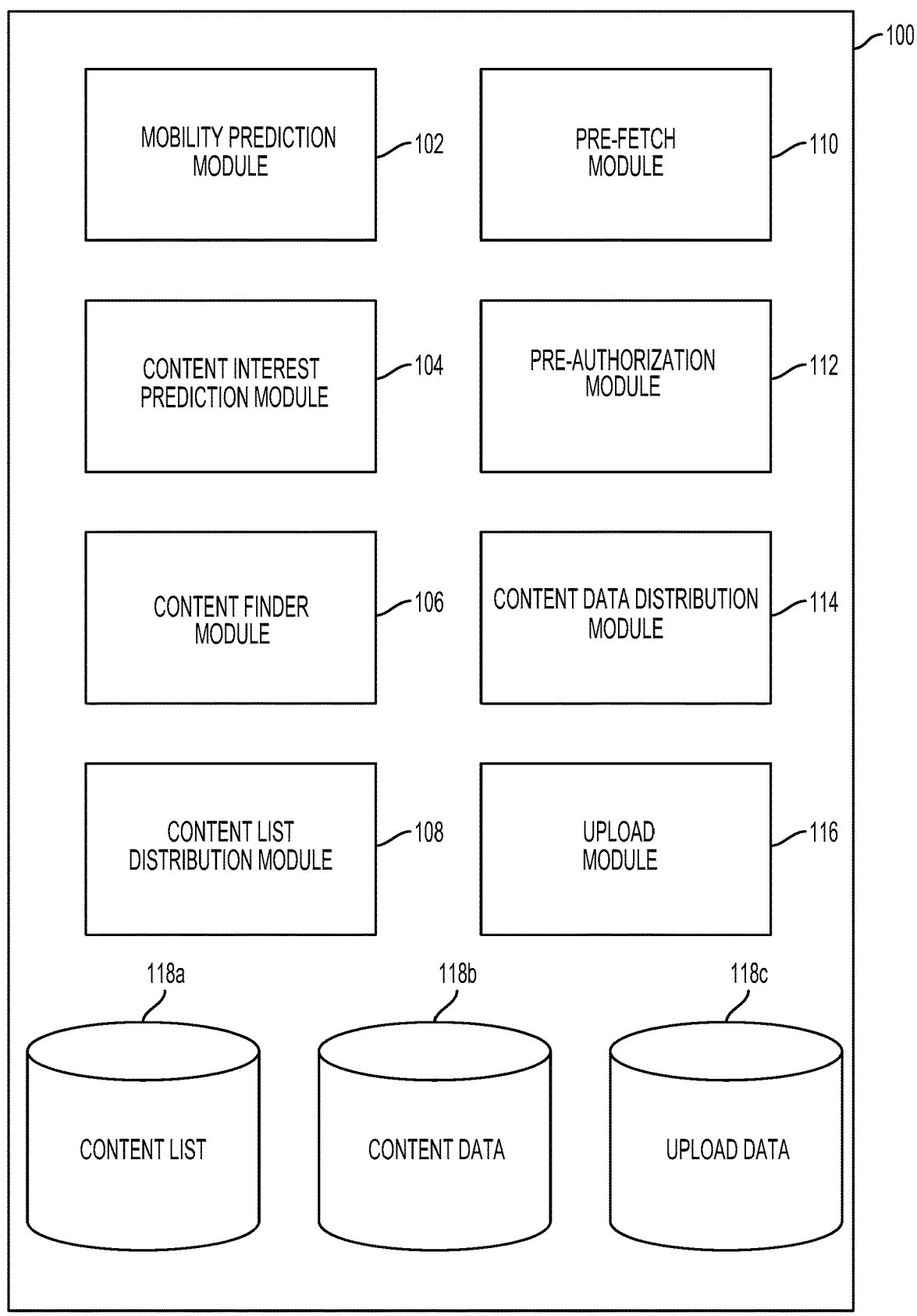
FIG. 2 is a high-level block diagram of the root node of FIG. 1, exemplary of an embodiment.

FIG. 2 provides a high-level block diagram of root node 100. As depicted, node 100 includes a mobility prediction module 102, a content interest prediction module 104, a content finder module 106, a content list distribution module 108, a pre-fetch module 110, a pre-authorization module 112, a content data distribution module 114, and an upload module 116.

Mobility prediction module 102 is configured to perform mobility prediction for a particular user. For example, mobility prediction module 102 may process a variety of data to predict a user's location at particular future points in times (e.g., at times $T_1, T_2, \ldots T_N$). Mobility prediction module 102 may predict a user's future locations, for example, by processing data reflective of the user's current location, trajectory, speed, as may be obtained from onboard sensors (e.g., a GPS sensor) of a mobile device 200 and transmitted therefrom to root node 100, and data reflective of possible travel routes, e.g., road maps obtained from an online mapping service. In an embodiment, mobility prediction module 102 may also process data reflective of a user's travel plans, e.g., as obtained from a route planning application executing at a device 200 or from a server of a travel agency, an airline, or the like.

In an embodiment, mobility prediction module 102 may be configured to predict other aspects of a user's situation at particular future points in time including, for example, an activity that will be performed by the user, an application that will be executed at the user's device 200, etc.

Mobility prediction module 102 may predict aspects of a user's situation based on, e.g., the user's predicted location. So, for example, mobility prediction module 102 may predict that a particular user will be working, shopping, commuting, at home, etc., based on the user's predicted locations. Mobility prediction module 102 may predict aspects of a user's situation based on, e.g., the time of day, the day of the week, to determine whether a future time period falls within working hours.

Mobility prediction module 102 may also predict aspects of a user's situation based on data reflective of the user's current activities, or current applications being executed at the user's mobile device. In one specific example, mobility prediction module 102 may determine that a user will likely be watching a streaming video in five minutes based on data indicating that the user is currently watching the video and the video has one hour remaining, as may be determined from an video application executing at device 200. In another specific example, mobility prediction module 102 may determine that a user will likely be listening to music in two minutes based on data indicating that the user is currently jogging, e.g., as may be determined from onboard sensors (e.g., gyroscope) of device 200, and based on historical data indicating that the user typically listens to music when jogging.

Mobility prediction module 102 may also predict aspects of a user's situation based on locations of other users, e.g., to determine when the user is in a crowd.

In an embodiment, mobility prediction module 102 may implement one or more conventional mobility prediction algorithms. In an embodiment, mobility prediction module 102 may predict a user future's situation using a statistical model such as, e.g., a hidden Markov model, which may be trained using population data or user-specific data.

Content interest prediction module 104 is configured to perform content interest prediction to identify content items expected to be of interest to a particular user. Content interest prediction module 104 may perform content interest prediction by processing data reflective of a user's past content consumption (e.g., a browsing history, history of viewed videos), or data reflective of a user's current content consumption (e.g., searches being conducted, articles being read). Content interest prediction module 104 may perform content interest prediction by processing data reflective of data consumption behaviour of a population of users, e.g., other users of networks 8. In this way, popular or trending content may be identified as being of interest to a particular user.

In an embodiment, content interest prediction module 104 may take into account data reflecting the situations of other users in the population of users, to more heavily weigh data consumption behaviour of other users in situations similar to the user's predicted future situations. Content interest prediction module 104 may also group users by demographic characteristics and more heavily weigh data from users having similar demographic characteristics.

Content items may include any type of content data that a user might access in the future. Content items may include publically-available data, e.g., webpages, Youtube™ videos, or the like. Content items may also include private secured-access data, e.g., incoming e-mails, or Dropbox™ files, etc. Access to private data may be facilitated by pre-authorization module 112, as described below.

Content items of interest to the user may also include types of content data that are used by device 200 or an application executing at mobile device 200. The user of device 200 may not be aware of exchange or use of such content data. For example content items may include DNS translations of hostnames to IP addresses, as may be used by applications executing at device 200.

Content items may be identified at a high-level of generality, e.g., news, baseball, etc. Content items may be also be identified more precisely, e.g., a particular URL, a particular keyword, a particular webpage, a particular document, or a particular video, etc. Content items may be predicted even more precisely, e.g., a particular portion of a document that has changed since the user last accessed the document, or a particular segment of a video, etc.

Content interest prediction may be performed based on historical data reflective of a user's content consumption spanning a long period of time, e.g., days, weeks, months, etc. In one specific example, content interest prediction module 104 may predict that a user is interested in weather forecasts for a particular city based on data showing that the user has consistently retrieved such forecasts over a period of time.

Content interest prediction may also be performed based on real-time or near real-time data, e.g., a user's activity in the last few minutes or seconds. In one specific example, content interest prediction module 104 may predict that a user is interested in a particular segment of a video based on data showing that the user is currently watching a preceding segment of that video.

Content interest prediction may take into account the user's predicted situation, as may be provided by mobility prediction module 102. For example, content interests may be predicted based on the user's location, activity, whether the user is at work or at home, weather conditions at the user's location, etc.

In one specific example, a user at work receives an alarm indicating an alarm condition at her home (e.g., a washing machine leak), and begins traveling home to deal with the alarm condition. In this example, mobility prediction module 102 may receive data indicating the alarm condition, and indicating that the user is traveling on a route towards home. On this basis of this data, mobility prediction module 104 may predict the user's situation, e.g., that the user is returning home to fix her washing machine. Content interest prediction module 104 may use this predicted situation to predict content items expected to be of interest to the user upon returning home, e.g., content items relating to alarm information, repair information, safety information, mechanic contact information, all of which may be assigned high priority given the urgency of the situation. These content items may then be transmitted to a child node 150 proximate the user's home.

The user's predicted situation may also include status information of the user's device, e.g., device state, battery level, programs running, commands received, etc.

Content interest prediction may also be performed based on information regarding other users who may be associated with the other user, e.g., friends, family, etc. In an embodiment, content interest prediction module 104 may obtain information regarding such other users by way of the particular user's contact list, which may be retrieved from mobile device 200 or a remote server, e.g., a social media platform.

Content interest prediction module 104 may obtain various data relating to such other users including, for example, historical data indicating content accessed by such other users, real-time or near real-time data indicating content being accessed by such other users, real-time or near real-time data indicating a current situation (e.g., location, activity, etc.) of such other users. In an embodiment, content interest prediction module 104 may receive such data from a node in system 10 instantiated for one of the other users.

In one specific example, content interest prediction module 104 adds a particular video to the user's content list upon determining that a friend or family member of the user has accessed that video.

Content interest prediction module 104 may assess a degree of affinity between the particular user and particular other users, and weigh behaviour data of other users based on the degree of affinity. The degree of affinity may be determined from data regarding frequency of contact, shared interest, shared demographics, or the like.

In an embodiment, content interest prediction module 104 may receive notifications from one or more content sources that new content is available, or that content previously-accessed by the user has been updated or changed. In such cases, content interest prediction module 104 may assess whether the new/updated content is expected to be of interest to the user.

In an embodiment, content interest predictions module 104 may receive content interest predictions from one or more trusted entities, and such content interest predictions may be added to the node's content list without scrutiny.

Content interest prediction module 104 generates a content list having entries identifying content items expected to be of interest to the user. Content interest prediction module 104 maintains this content list in a data store 118a. Content interest prediction module 104 updates this content list in data store 118a as new content interest predictions are made. Content interest prediction module 104 also updates the content list in data store 118a as content list updates are received from other nodes, from the user's mobile device 200, or from other entities.

Content finder module 106 is adapted to perform content discovery by searching for locations of content items, as may be provided by content interest prediction module 104. For example, content finder module 106 may search for content items by scanning various content sources; content finder module 106 may also search for content in local caches and caches in interconnected nodes, e.g., caching nodes.

Content finder module 106 updates the content list in data store 118a to include locations of content items, as found. In some cases, multiple locations for the same content may be found, and each location may be stored in the content list in data store 118a.

Content finder module 106 may also include in the content list an indicator of whether authorization is required to access the content, e.g., when the content item is a bank statement. Content finder module 106 may also include in the content list an indicator of whether payment is required to access the content, e.g., when the content item is behind a paywall. Content finder module 106 may also include in the content list an indicator of network transmission characteristics associated with a particular location, e.g., latency, delay of access, data rate, cost, etc. The cost may, for example, be a network cost or a monetary cost.

Content list distribution module 108 is configured to distribute content list data to child nodes 150. Content list distribution module 108 processes a list of content items predicted to be of interest to the user, e.g., as stored in data store 118a, to assign priorities to identified content items. Content list distribution module 108 selects a subset of the list of content items for transmitting to at least one of the child nodes 150. The subset may be selected based on the determined priorities, a predicted future location of the particular user, and the geographic location of that child node 150.

In an embodiment, the subset may be selected based on other aspects of a user's predicted situation, e.g., activities that will be performed, applications that will be executed, etc.

In an embodiment, the priorities for content items may be determined based on network transmission characteristics associated with the locations of content items, noted above. In an embodiment, the priorities for content items may be determined based a cost of accessing those content items, which may be, e.g., a monetary cost or a network cost.

Content list distribution module 108 selects a subset of the list of content items for transmitting to at least one of the child nodes 150. The subset may be selected based on the determined priorities, a predicted future location of the particular user, and the geographic location of that child node 150. In an embodiment, the subset may be selected based on other aspects of a user's predicted situation, e.g., activities that will be performed, applications that will be executed, etc.

In an embodiment, content list distribution module 108 provides to each child node 150 the priority assigned to each content item transmitted to that child node 150.

In an embodiment, content list distribution module 108 maintains a record of previous content list data sent to each child node 150. In this embodiment, content finder module 106 sends content list updates reflecting new/updated content items.

In an embodiment, when a content item is available at multiple locations, as may be found by content finder module 106, content list distribution module 108 may determine a preferred location to retrieve that data, based on predictions of the user's future location/situation. The preferred location may be indicated as such in the content list among other alternate locations. In an embodiment, content list distribution module 108 may select a preferred location based on network transmission characteristics associated with a particular location (e.g., latency, delay of access, data rate, etc.).

In an embodiment, mobile device 200 may maintain its own content list. In this embodiment, content list distribution module 108 also sends content list updates to mobile device 200 so that mobile device 200 may maintain its contact list in synchrony with the contact list at root node 100.

Referring again to FIG. 2, pre-fetch module 110 is configured to pre-fetch content data for a particular user. Pre-fetch module 100 may pre-fetch content data according to content items, locations and priorities in the content list described above, as updated by content interest prediction module 104, content finder module 106, and content list distribution module 108. In an embodiment, pre-fetch module 100 may use a different content list, which may be provided by an external entity. Pre-fetched content data may be stored at root node 100, e.g., in content data store 118b, for later transmission.

When multiple locations are available for pre-fetching the same content data, pre-fetch module 100 may select a preferred location, e.g., a location close to the user, or a low-cost location.

In an embodiment, pre-fetch module 110 keeps track of any changes in content items at a content source, including availability of new content data. Such content items may be content items identified in the content list generated by content interest prediction module 104, or another content list. So, pre-fetch module 110 determines when particular data at the content source changes, and in response, retrieves that data. In this way, pre-fetch module 110 keeps the pre-fetched data at root node 100 synchronized with the data at the content source.

In one example, pre-fetch module 110 may periodically poll a content server from time to time to determine when particular data has changed for updates. Such polling may be conducted to a pre-set schedule, or may be conducted according to network resource availability (e.g., when there are low traffic conditions). In another example, a content server may notify pre-fetch module 110 of changes in content data. In some cases, changes may be automatically pushed to pre-fetch module 110, or changes may be retrieved by pre-fetch module 110 upon receiving notification. In some cases, pre-fetch module 110 may subscribe to receive such notifications. In another example, a content source may provide a schedule of when content data is expected to change (e.g., when a new episode of a video program will be made available for download), and pre-fetch module 110 may retrieve the new content data according to the provided schedule.

In an embodiment, pre-fetch module 110 may pre-fetch content data from a content source at a time based on a prediction of when the user will require that data. For example, if pre-fetch module 110 receives a prediction that a user will want to watch a particular video at a particular time, pre-fetch module 110 may pre-fetch data for that video a time between when that video becomes available and the predicted viewing time. The particular time that the data is pre-fetched may depend on various factors including, for example, congestion of the network, e.g., link condition, costs, and the user's location.

Upon determining that particular content data has changed, pre-fetch module 110 may send a notification to one or more of child nodes 150. Pre-fetch module 110 may also send a notification to mobile device 200. In an embodiment, child nodes 150 and/or device 200 are notified immediately of such changes.

Upon receipt of such notifications, child nodes 150 and/or device 200 may optionally retrieve some or all of the changed content data. The content data may be retrieved from root node 100 or from the content source.

In one specific example, device 200 may pre-fetch temperature sensor data from various monitored locations. Until that sensor data changes from its last pre-fetched state, there is no need to pre-fetch new data. When a change occurs, as may be determined according to any of the manners described above, device 200 may receive notification of the change. At that time, device 200 may pre-fetch the new sensor data.

In an embodiment, in lieu of pre-fetching certain content data for a content item, pre-fetch module 110 may transmit a request to a child node 150 to pre-fetch that content data at that child node 150. Pre-fetch module 110 may issue such a request, for example, when a content item is found at a location closer to that child node 150. The request may include, an identifier of the content item to be pre-fetched. The identifier may include a location of the content item.

Pre-authorization module 112 is configured to establish connections with interconnected servers which require user/device authorization. Pre-authorization module 112 may maintain user or device credentials for such servers and present such credentials to establish authenticated connections. Content finder module 106 may use such authenticated connections to find content located at the interconnected servers. Pre-fetch module 110 may use such authenticated connections to pre-fetch data from the interconnected servers. Upload module 116 may use such authenticated connections to upload data to the interconnected servers, as detailed below.

In an embodiment, pre-authorization module 112 establishes an authorized connection with an interconnected server based on a predicted user need for the authorized connection, e.g., to download or upload data. In this way, delay associated with establishing such connections may be avoided when the authorized connection is needed.

In an embodiments, pre-authorization module 112 may be adapted to maintain the connection, e.g., by periodic transmission of keep-alive signals. In this way, a connection may be maintained on behalf of the user even if the user's mobile device 200 loses connectivity.

Content data distribution module 114 is configured to transmit pre-fetched content data. Pre-fetched content data may be retrieved from content data store 118b for transmission. Content data distribution module 114 may, for example, transmit parts of pre-fetched content to one or more of child nodes 150. Such content data may be stored at a child node 150 until needed at the user's mobile device 200.

Content data distribution module 114 assigns priorities to parts of the pre-fetched content data. Priorities may be determined based on the predicted future locations of the user. For example, for a predicted location, content data distribution module 114 may estimate a likelihood that the part of the pre-fetched content data will be needed at the user's mobile device 200, and when (e.g., how soon) that data will be needed (e.g., short term, long term, within time $T_1$, between $T_1$ and $T_2$, between $T_2$ and $T_3$).

In an embodiment, the priorities for parts of pre-fetched content data may be determined based on other aspects of a user's predicted situation, e.g., activities that will be performed, applications that will be executed, etc.

The particular part of the pre-fetched content data transmitted to each child node 150 may be based on the determined priorities, the location of the child node 150, the predicted location of the user and the predicted content data needs of the user when at the predicted location. In an embodiment, the portion may be selected based on other aspects of a user's predicted situation, e.g., activities that will be performed, applications that will be executed, etc. In this way, pre-fetched content data is sent towards a location or locations proximate to where the user is expected to be when that data is needed.

The particular part of the pre-fetched content data transmitted to each child node 150 may also be based on other factors including, for example, the quantity of the pre-fetched content data expected to be consumed at device 200 while proximate a particular child node 150, how soon content data will be needed at device 200, a cost or a metric of network conditions associated with data communication between the root node 100 and a particular child node 150, or a cost or a metric of network conditions associated with data communication between a particular child node 150 and device 200.

The cost may, for example, be a monetary cost or a network cost associated with data communication with a particular child node 150. The metric of network conditions may, for example, reflect a data rate, latency, capacity, congestion state, or a load of particular link(s) or nodes. The metric of network conditions may, for example, be a Quality of Experience metric associated with data communication with a particular child node 150.

The particular part of the pre-fetched content data transmitted to each child node 150 may be at least partly based on the data transmission characteristics associated with that child node 150, e.g., transmission costs, data rate, capacity, latency, etc., as noted above. Such data transmission characteristics may be received from the child nodes 150, or from monitors residing in a network 8. The particular part of the pre-fetched content data transmitted to each child node 150 may also be based on the transmission preferences of the user, or of an application executing at the user's mobile device, as noted above.

In an embodiment, the particular part of the pre-fetched content data transmitted to each child node 150 may take into account other traffic being transmitted through networks 8, e.g., traffic associated with other users.

The particular part of the pre-fetched content data transmitted to each child node 150 may be based on a combination of the factors noted above.

Thus, content data distribution module 114 analyzes the pre-fetched content data to determine the characteristics of content item (e.g., size, urgency, data type). Content data distribution module 114 also determines the data transmission characteristics of each child node 150, e.g., to classify a child node 150 as a "Type A" node or a "Type B" node. Content data distribution module 114 also analyzes any data transmission preferences specified by the particular user, e.g., tolerance for transmission costs, latency requirements, etc. Content data distribution module 114 selects content data for transmission to each child node 150 by matching the characteristics of the data to the data transmission characteristics of each child node 150, while satisfying at least some of the data transmission preferences.

In an embodiment, content data distribution module 114 select a particular child node 150 to receive data based on any of the factor listed for selection of subsets of pre-fetched content data. So, for example, a particular child node 150 may be selected based on one or more of the data transmission characteristics, the data transmission preferences, etc.

Conveniently, in this embodiment, use of scarce data transmission resources may be improved. For example, delay-tolerant content data may be transferred to a child node 150 that the user will reach later (e.g., child node 150-2 rather child node 150-1). This may be particularly desirable if using later-reached child node 150 reduces data transmission costs.

Figure 3:
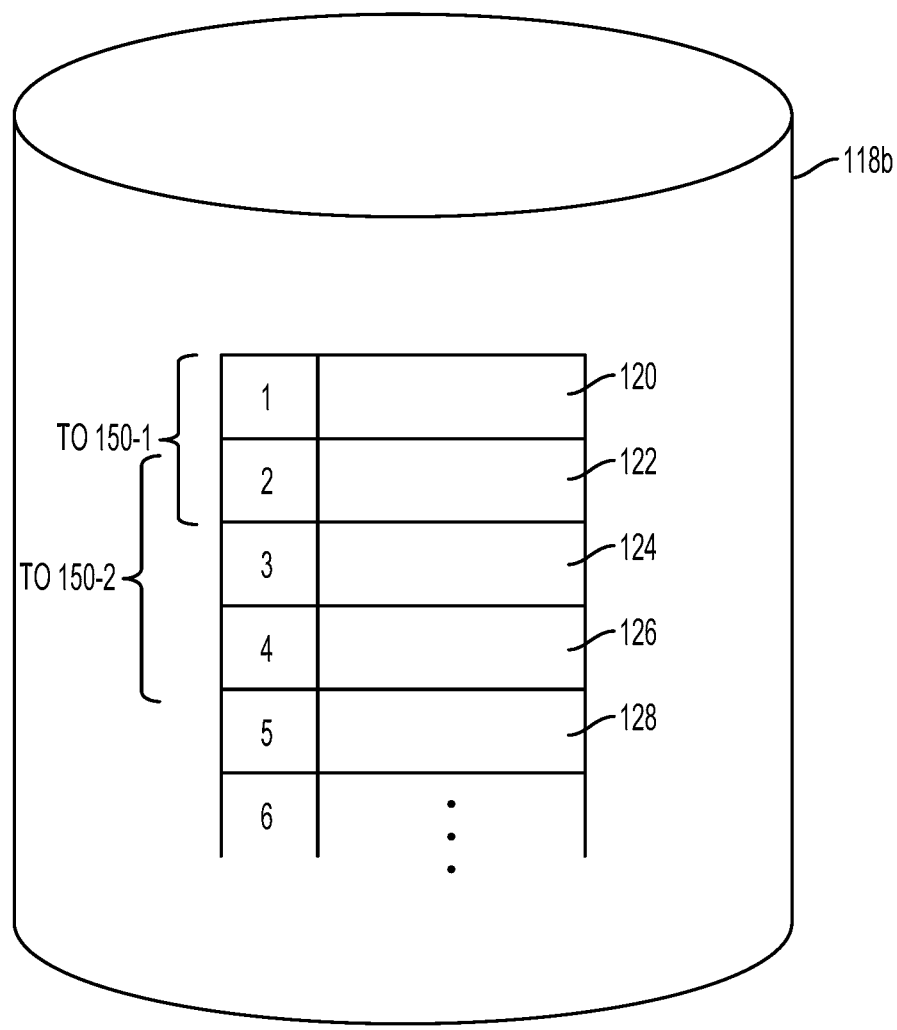
FIG. 3 is a schematic diagram showing selection of portions of content data to be sent from a root node to child nodes, exemplary of an embodiment.

FIG. 3 depicts an example set of pre-fetched content data 120, 122, 124, 126, 128, and so on, as may be stored in data store 118b. Content data in this set are depicted in order of priority, e.g., 1, 2, 3, 4, 5, 6, and so on. As depicted, for this example set of content data, a subset including content data 120 and 122 is selected for transmission to child node 150-1. This subset of content data is expected be required at the user's mobile device 200 when the user is proximate to child node 150-1, and suited to the transmission characteristics of child node 150-1 and the user's data transmission preferences.

Another subset including content data 122, 124, and 126, is selected for transmission to child node 150-2. This subset of content data is expected to be required at device 200 when the user is proximate to child node 150-2, and suited to the transmission characteristics of child node 150-2 and the user's data transmission preferences.

As depicted, although the subsets of pre-fetched content data sent to each child node 150 may differ, the subsets may overlap. For example, some pre-fetched content data (e.g., content data 122) may be sent to multiple child nodes. So, the pre-fetched content data maintained at each child node may be unique. Further, each child node 150 may pre-fetch additional data.

Some parts of the content data (e.g., data 128) may be transmitted to no child nodes. Such content data may include, for example, data not expected to be needed at the user's device in the near future. Such content data may also include, for example, data that cannot be transmitted while satisfying the user's preferences for transmission costs. Such content data may, for example, be transmitted at a later time when the data can be transmitted to device 200 at a lower cost.

In an embodiment, content data distribution module 114 may divide large content items into a plurality of portions and transmit portions to multiple child nodes 150, or at separate times (e.g., in separate subsets). Dividing a content item may be desirable, for example, when link capacity or storage capacity at a child node 150 is constrained. The portions of the content item may be transmitted to the device 200 from the multiple child nodes 150. Device 200 may reassemble the content item from received portions, or may use the content item portion by portion (e.g., as may be the case with streaming video). The content item may also be reassembled at a child node 150, e.g., when the portions of the content item are sent at separate times to the same child node 150.

In an embodiment, content data distribution module 114 maintains a record of previous pre-fetched content data sent to each child node 150. In this embodiment, pre-fetch module 110 sends content data updates reflecting new/updated content data. For example, updates may take the form of a data delta or difference from a previous update. In an embodiment, new/updated content data may be compressed before transmission, and may be decompressed at a child node 150 or at mobile device 200.

In an embodiment, parts or all of the pre-fetched content data may also be transmitted directly to the user's mobile device 200.

In an embodiment, content data distribution module 114 provides to each child node 150 the priorities assigned to content data transmitted to that child node 150.

Upload module 116 is configured to upload user data to interconnected servers. User data may be received from the user's mobile device 200, either directly, or by way of child nodes 150. Received user data may be temporarily stored in upload data store 118c before it is transmitted to an interconnected server. User data may, for example, include data used to obtain access to further content data.

In an embodiment, user data for upload may be provided to mobility prediction module 102, to predict the user's situation/location based on the user data. In an embodiment, user data for upload may be provided to content interest prediction module 104, to predict the user's content interests based on the user data.

In an embodiment, user data for upload may include indicators of content data stored at the mobile device 200. Nodes 100 and 150 may process that data, for example, to identify content that does not need to be transmitted to device 200 and therefore should not be pre-fetched. Indications of content data stored at the mobile device 200 may be shared with other users or devices, for retrieval of content from mobile device 200.

In an embodiment, root node 100 may determine that no child node 150 exists at a location suitably proximate a predicted future location of the user, and may cause a new child node 150 to be instantiated. Content list distribution module 108 may then transmit content list data to the newly instantiated child node. Similarly, content data distribution module 114 may then transmit pre-fetched content data to the newly instantiated child node. Each of child nodes 150 may be configured to have some or all of the modules and data stores of root node 100, as depicted in FIG. 2.

As noted, each child node 150 maintains its own content list. Each child node may include a content list data store 118a to store content list data. Each node 150 populates data store 118a with content list data and any updates received.

In an embodiment, each child node 150 may include a mobility prediction module to perform mobility prediction in manners similar to root node 100, as described above. A child node 150 may have access to data useful for such prediction that are not available to root node 100, or access to such data sooner than root node 100, e.g., by virtue of being located closer to the user, or being made aware of mobility of multiple users in proximity to the child node 150. In one example, a child node 150 may receive sensor data from the user's mobile device 200 before root node 100. In another example, a child node 150 may be able to access local traffic data or local weather data for its particular geographic location. So, in some cases, a child node 150 may able to generate more accurate or more timely user mobility predictions.

In this embodiment, each child node 150 may exchange user mobility prediction updates with root node 100. Such updates may include data for predicting user mobility or any predictions that have been made. In this way, predictions at each node may take advantage of available data relating to user locations or user situations.

In an embodiment, each child node 150 may re-assess the priority of content data, as received from root node 100. For example, child node 150 may re-assess the priority of content data based on mobility predictions made at that node, and priorities may be updated. The child node 150 may use such re-assessed priorities to determine when and what content data are transmitted to other nodes or to mobile device 200.

Data reflective of updated priorities determined by child node 150 may be transmitted to root node 100. Such data may also be sent to mobile device 200.

In an embodiment, each child node 150 may determine updates to its content list. For example, each child node 150 may include a content interest prediction module 102 to identify additional content items that may be of interest to the user, in manners similar to root node 100, as described above. Content interest predictions performed at each child node 150 may take into account any user mobility predictions generated at that child node 150 or otherwise obtained at that child node 150.

Each child node 150 may also include a content finder module 106 to find locations, e.g., including alternate locations, of content items identified in its content list. Each child node 150 may search within a local network neighbourhood, for example, in its local cache or in neighbouring caching nodes, which may not have been searched by root node 100. So, locations for content items closer to the user may be found.

A child node 150 may send content list updates, e.g., reflecting new predictions or locations, to root node 100. A child node 150 may also send content list updates to mobile device 200.

In an embodiment, a child node 150 includes a pre-fetch module 110 to pre-fetch content data based on its content list, in manners similar to root node 100, as described above. Pre-fetched content data may be stored at the child node 150, e.g., in a content data store 118b, for subsequent transmission to mobile device 200. Any pre-fetched content data received from root node 100 may also be stored in content data store 118b for subsequent transmission to mobile device 200 or to another node. A child node 150 may pre-fetch particular content data upon receiving a request from root node 100.

Conveniently, in this embodiment, child nodes 150 receive pre-fetched content data from a root node 100. Such data received from root node 100 need not be retrieved by a child node from a remote content source.

Each child node 150 may assign priorities to pre-fetched content data for subsequent transmission in manners similar to root node 100, as described above. Prioritization at the child node 150 may take into account any user mobility predictions made at that node.

Each child node 150 may also include an upload module 116 that receives upload data from a mobile device 200 and transmits that data to root node 100, e.g., for subsequent transmission to a destination server. Upload data may be temporarily stored in an upload data store 218c until transmission.

As noted, mobile device 200 may maintain its own content list, and keep this content list synchronized with the content list at root node 100. Mobile device 200 may generate new content list data to reflect interests predicted or otherwise determined at the mobile device, and update its content list accordingly. For example, as the user of mobile device 200 accesses content, mobile device 200 may identify related content items and update its content list to include such related content items.

Mobile device 200 may also search for locations of content items, e.g., in a local cache or within a local area network. Mobile device 200 may include such locations in the content list and update one or more of the nodes (e.g., root node 100 and child nodes 150).

The content list at mobile device 200 may be updated by the user, a user agent, an application executing at device 200. The mobile device may transmit a content list update to one or more of the nodes (e.g., root node 100 and child nodes 150).

In one specific example, a user may be driving a car under icy road conditions. Mobile device 200 may receive data indicating that the user is driving (e.g., from onboard accelerometer or GPS sensor readings) and data indicating local weather conditions. On the basis of this data, mobile device 200 may predict that the user will be interested in particular content, e.g., driving instructions for icy road conditions. Mobile device 200 may assign a high priority to this content item given that the driver is currently driving. This content interest may be updated to child nodes 150 proximate the driver's route.

In another specific example, a soccer player traveling to a soccer tournament may indicate that she is interested in information relating to a particular position or weaknesses of the opposing team. This content interest may be distributed to child nodes 150 proximate the soccer field.

This content interest may trigger the same interest being added to content lists of other users, e.g., by a content interest prediction module 104 servicing those other users. Such other users may, for example, be users having similar interest profiles (e.g., a player who plays the same position) or users in close proximity to the soccer player (e.g., other players traveling to the soccer tournament).

In an embodiment, a mobile device 200 may share its content list with other mobile devices. Such other mobile devices may, for example, be mobile devices operated by friends, family or other trusted users. Such other mobile devices may be interconnected with device 200 by, e.g., a local area network, or a virtual local area network.

Mobile device 200 may share all or part of a content list with particular other users or other devices. For example, a shared part of a content list may relate to specific interest categories. Sharing a content list may facilitate retrieval of content data of interest to a group of users or devices, e.g., by one or more of the members of the group, to be shared amongst the group. Mobile device 200 may share all of part of a content list by way of root node 100 or one or more of child nodes 150.

Figure 4:
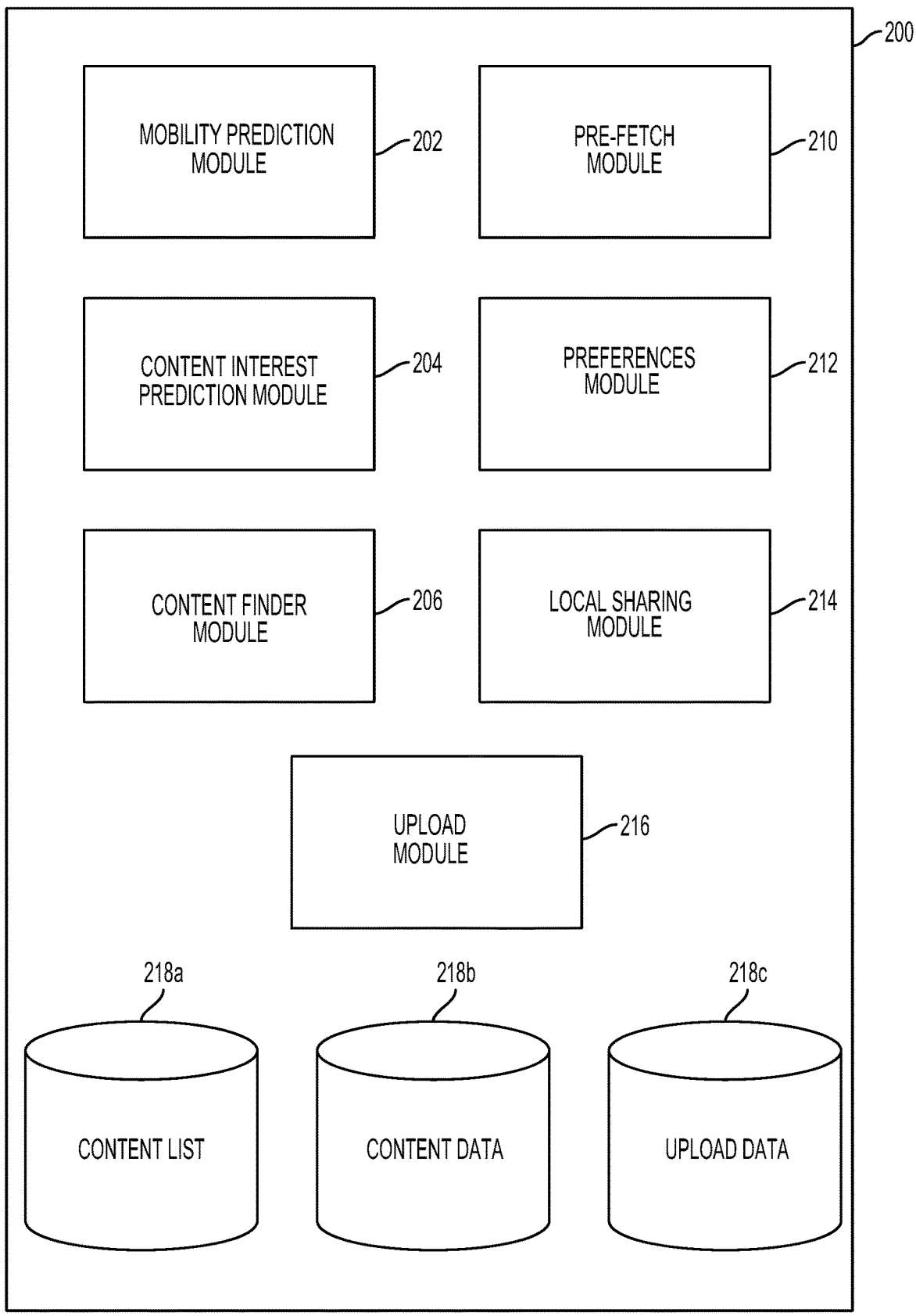
FIG. 4 is a high-level block diagram of the mobile device of FIG. 1, exemplary of an embodiment.

FIG. 4 provides a high-level block diagram of mobile device 200. As depicted, device 200 includes a mobility prediction module 202, a content interest prediction module 204, a content finder module 206, a pre-fetch module 210, a preferences module 212, a local sharing module 214, and an upload module 216.

Mobility prediction module 202 is configured to perform mobility prediction for the user of device 200 in manners similar to root node 100, as described above. Mobility prediction module 202 may have access to data useful for such predictions that are not available to root node 100 or any child node 150, or access to such data sooner than root node 100 or any child node 150. So, in some cases, mobility prediction module 202 may able to generate more accurate or more timely user mobility predictions.

Mobile prediction module 202 may exchange user mobility prediction updates with root node 100 or one or more child nodes 150. Such updates may include data for predicting user mobility or any predictions that have been made.

Content interest prediction module 204 is configured to perform content interest prediction for the user of device 200 in manners similar to root node 100, as described above. Content interest prediction module 204 maintains a list of content items expected to be of interest to the user, for example, in content list data store 218*a*. Content interest prediction module 204 may exchange updates to the list of content items with root node 100 or one or more child nodes 150.

Content finder module 206 is configured to find locations, e.g., including alternate locations of content items identified in its content list. Device 200 may search within a local network neighbourhood, e.g., within other mobile devices interconnected with device 200 and sharing data with device 200, which may not searched by root node 100 or any child node 150. Such other mobile devices may, for example, be mobile devices operated by friends, family or other entities who are trusted by the user of device 200. Such other mobile devices may be interconnected with device 200 by, for example, a local area network, or a Virtual local area network.

When device 200 finds a content item identified in its content list at such a local location, it may retrieve that data from the local location.

In an embodiment, device 200 may transmit data to root node 100 and one or more child nodes 150 to indicate that the content item has been found and retrieved locally, e.g., to prevent the same content data from being pre-fetched at one of nodes 100 or 150. Along with such notification, device 200 may transmit data reflecting information regarding the up-to-date status of the locally-found content item (e.g., a timestamp). So, nodes 100 and/or 150 may compare the state of content item found by device 200 with the state of the content item located elsewhere (e.g., at the original content source). When the content item changes at the source, nodes 100 and/or 150 may update the content list accordingly, and notify device 200. Nodes 100 and/or 150 may also retrieve content data for the updated content item, for forwarding the device 200.

Pre-fetch module 210 is configured to pre-fetch data based on the content list maintained at device 200, e.g., in content list data store 218*a*. Data may be pre-fetched from a root node 100, a child node 150, a location local to device 200 (e.g., its memory), or another content source. Pre-fetched data may be stored in content data store 218*b* until needed at device 200. When particular data are retrieved from a location local to device 200, pre-fetch module 210 may send a notification to root node 100, and/or child nodes 150 that the particular data has been retrieved. The notification may prevent, for example, the root node 100 or a child node 150 for unnecessarily retrieving that particular data.

In an embodiment, pre-fetch module 210 may be configured to select a particular child node 150 from which to retrieve content data from based on data transmission preferences, as determined by preferences module 212 described below, and the data transmission characteristics of those child nodes 150, as may be received from the child nodes 150, root node 100, or from monitors residing in a network 8.

In an embodiment, mobile device 200 maintains a local mirror of data pre-fetched at root node 100 to make that data available at mobile device 200 when needed. So, for example, pre-fetch module 210 may be configured to retrieve pre-fetched data stored in content data store 118 at root node 100, and store that content in content data store 218 at device 200. This data may be received by device 100 from root node 100 by way of one or more of child nodes 150.

In an embodiment, mobile device 200 maintains a local mirror of data pre-fetched at one or more of child nodes 150. So, for example, pre-fetch module 210 may be configured to retrieve pre-fetched data stored in content data store 118 at a child node 150, and store that content in content data store 218 at device 200.

As noted, when sending pre-fetched data, the nodes may transmit updates reflecting new/updated content data (e.g., data deltas or differences).

In an embodiment, mobile device 200 maintains a partial local mirror of data pre-fetched at root node 100 and/or one or more child nodes 150.

In an embodiment, mobile device 200 updates its local mirror of pre-fetched data only when an appropriate connection (e.g., high-rate, low cost) is available.

In an embodiment, mobile device 200 may maintain records identifying pre-fetched data available at the nodes (e.g., root node 100 and child nodes 150). In this embodiment, mobile device 200 may pre-fetch data directly from a remote content source upon determining that the data is not available at the nodes.

Preferences module 212 is configured to maintain records reflective of data transmission preferences of the user, or an application executing at the user's mobile device. As noted, such preferences may, for example, relate to when data is required, data transmission latency, tolerance for access costs. Preferences module 212 may maintain records for preferences for particular types of traffic, particular applications, or particular user situations (e.g., whether the user is at work or at home).

In an embodiment, preferences module 212 may receive such preferences from a particular application, or from remote entity by way of a network 8. In an embodiment, preferences module 212 may determine such preferences automatically, e.g., by analyzing data transmission traffic to and from device 200. In an embodiment, preferences module 212 may receive preferences from the user, e.g., by way of a graphical user interface presented by preferences module 212.

Local sharing module 214 is configured to selectively share pre-fetched data stored at device 200. For example, local sharing module 214 may maintain a list of authorized users and/or devices that may access some or all data stored in content data store 218*b*.

In one specific example, authorized users may be friends, family, or other users trusted by the user of device 200. In another specific example, authorized users may be devices on the same wireless network or on the same VPN as the user of device 200. In an embodiment, local sharing module 214 may be configured to authenticate users by way of login credentials. In an embodiment, local sharing module 214 may be configured to authenticate devices by way of a whitelist of device identifiers (e.g., an IMEI number, or a MAC address).

Upload module 216 is configured to upload data from device 200. Data to be uploaded may be stored in upload data store 218c. Data store 218c may be populated by applications executing at device 200, and may include content data destined for a remote server. Data to be uploaded may also include content interests to be provided to root node 100 and/or child nodes 150, as provided by content interest prediction module 204, or as specified by the user of device 200.

Upload module 216 may transmit data to be uploaded to a child node 150, which may forward the transmit data to root node 100. From the root node 100, the data may be further transmitted to a remote server.

In an embodiment, upload module 216 transmits data to a particular child node 150 selected based on data transmission characteristics of the child node 150 and the characteristics of the data to be uploaded. In an embodiment, upload module 216 also selects the particular child node based on data transmission preferences of the user.

In an embodiment, upload module 116 maintains a record of previously uploaded data and only sends upload updates reflecting new/updated upload data. For example, updates may take the form of a data delta or difference from a previous update. In an embodiment, new/updated upload data may be compressed before transmission.

Figure 5:
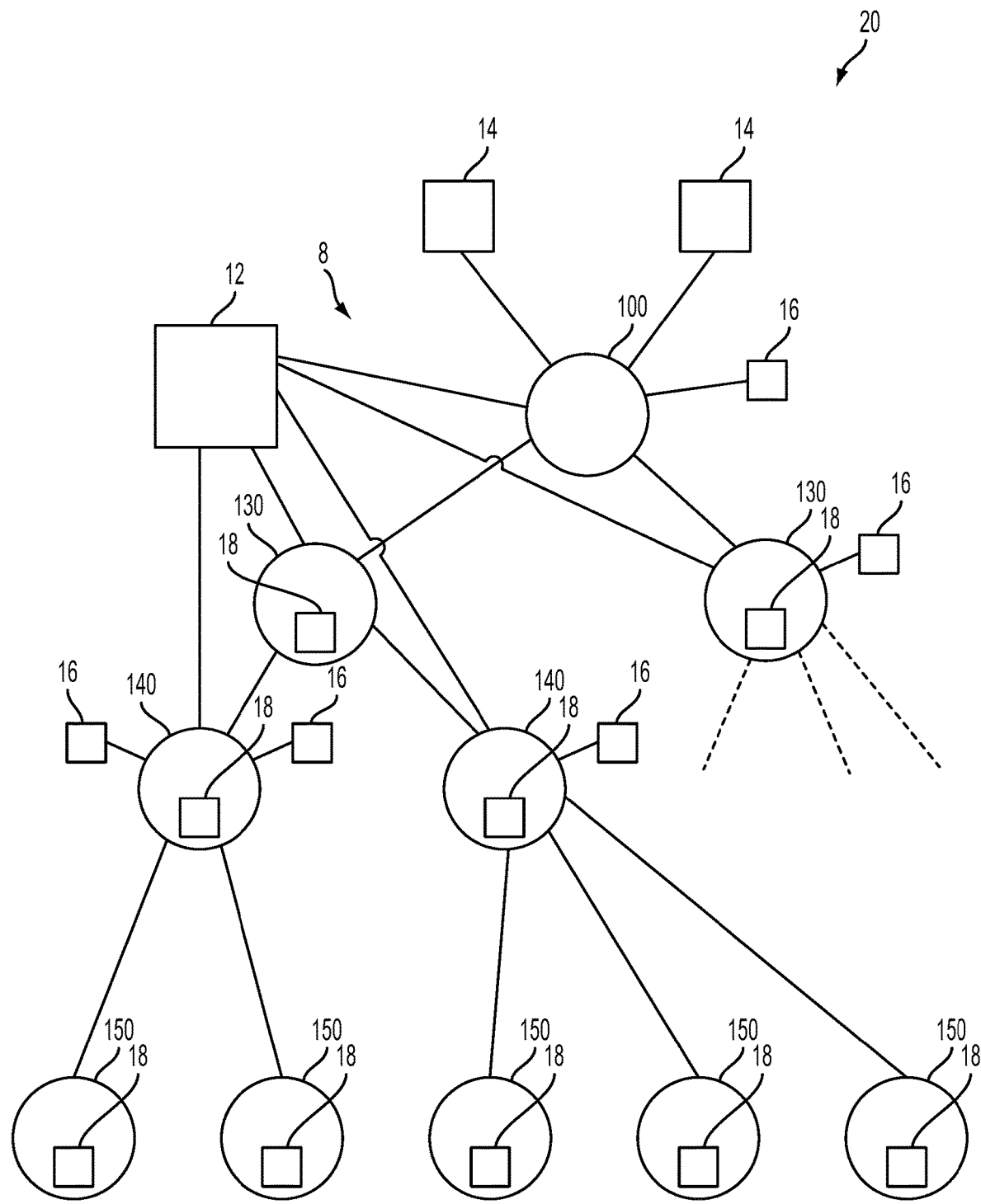
FIG. 5 is a schematic diagram of a data communication system including root nodes and child nodes arranged in a four-level hierarchy, exemplary of an embodiment.

FIG. 5 depicts a data communication system 10, exemplary of another embodiment. Content discovery system 20 differs from content discovery system 10 in that whereas system 10 includes nodes organized hierarchically into two levels (root node 100 at one level, and child nodes 150 below), system 20 includes nodes organized hierarchically into four levels.

In particular, system 20 includes a root node 100, child nodes 130 at a level below the root node 100, child nodes 140 at a level below child nodes 130, and child nodes 150 at a level below child nodes 140. Each of root node 100, child nodes 130, 140, and 150 are interconnected by at least one data communication network 8.

Root node 100 of system 20 may function in manners substantially similar to that described above for root node 100 of system 10. Each of child nodes 130, 140, and 150 may function in manners substantially similar to that described above for child node 150 system 10.

However, unlike in system 10, root node 100 does not send pre-fetched content data, i.e., content data updates, directly to child node 150. Rather, root node 100 transmits content data updates to child nodes 130; each child node 130 sends content data updates to its interconnected child nodes 140; each child node 140 sends content data updates to its interconnected child nodes 150. Finally, child node 150 may transmit content data updates to mobile device 200.

Further, unlike in system 10, root node 100 does not exchange data (e.g., content list updates, content list priority updates, user mobility prediction updates) directly with child node 150. Rather, root node 100 exchanges such data with child nodes 130; each child node 130 exchanges such data with its interconnected child nodes 140; each child node 140 exchanges such data with its interconnected child nodes 150. Finally, each child node 150 may exchange such data with mobile device 200.

Figure 6:
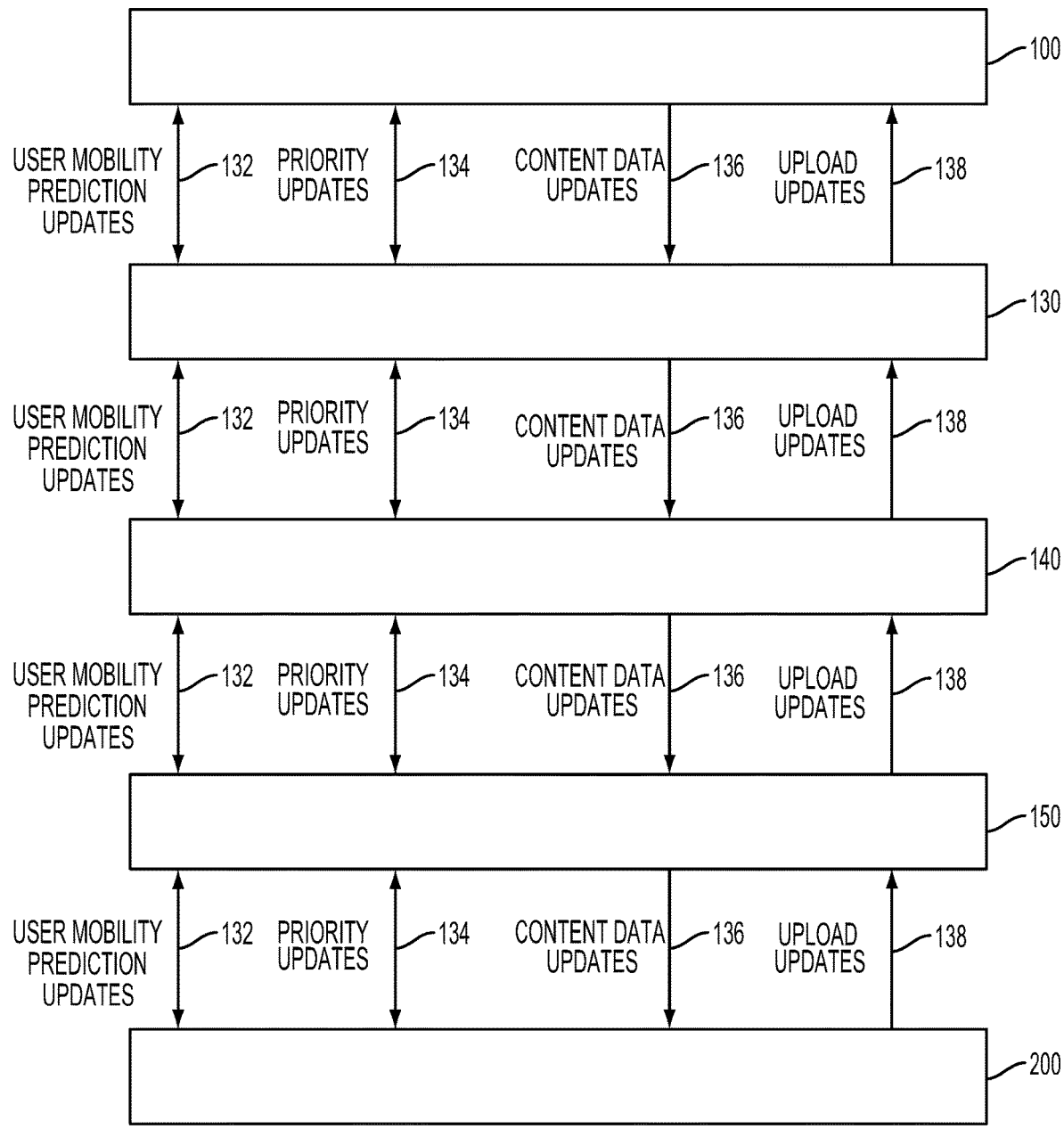
FIG. 6 is a data-flow diagram showing exchange of data between root nodes and child nodes in the system of FIG. 4, exemplary of an embodiment.

FIG. 6 illustrates the propagation of content data updates 136 for pre-fetched content data down the node hierarchy of system 20 towards predicted future locations of mobile device 200. FIG. 6 also illustrates the propagation of upload data updates 138 from mobile device 200 up the node hierarchy, e.g., towards a remote server.

Similarly, FIG. 6 illustrates example propagation of user mobility prediction updates 132, content data priority updates 134, up and down the node hierarchy of system 20.

Nodes in descending levels of the hierarchy may have progressively smaller geographic scope of responsibility. For example, while root node 100 may maintain pre-fetched content data for any content item expected to be of interest to the particular user, a node 130 maintains pre-fetched content data relevant for an assigned geographic region that the user is expected to move within or travel through. So, root node 100 selects a portion of its pre-fetched content data for transmission to a node 130 that includes content data expected to be needed at device 200 while the user is within the geographic region assigned to that node 130. The limited geographic scope of a node 130 also limits the temporal scope of the pre-fetched content data maintained at the node 130. For example, node 130 maintains pre-fetched content data that is expected to be needed at device 200 during the time period that the user is expected to be within the geographic region assigned to node 130.

Moving down the hierarchy, each node 140 maintains pre-fetched content data relevant for a subregion of the region assigned to its parent node 130. So, a node 130 selects a portion of its pre-fetched content data for transmission to a node 140 that includes content data expected to be needed at device 200 while the user is within the subregion assigned to that node 140. Each node 150 maintains pre-fetched content data relevant for an even smaller geographic area that is part of the subregion assigned to its parent node 140. So, a node 140 selects a portion of its pre-fetched content data for transmission to a node 150 that includes content data expected to be needed at device 200 while the user is within the area assigned to that node 150.

Nodes in descending levels of the hierarchy are progressively closer to the user's location. Thus, nodes at each descending level may have access to data for making more accurate or more timely user mobility predictions, and may be able to perform more accurate prioritization of content items and/or pre-fetched content data. As shown in FIG. 5, user mobility prediction updates and priority updates may be propagated from the lower levels upwards.

Nodes at each level of the hierarchy may cause a new node in a level below it to be instantiated to provide a new node at a location corresponding to a predicted future location of the user. Similarly, nodes at each level of the hierarchy may cause a node in a level below it to be deactivated or removed when it is no longer required.

Each of nodes 100, 130, 140, and 150 is interconnected with one or more traffic controllers 12. Each traffic controller 12 is configured to perform traffic engineering functions to control the transmission of traffic (e.g., routing and scheduling) in a respective data communication network 8. So, transmission of traffic in system 100, e.g., between nodes, or from nodes to a user's mobile device is controlled by the one or more traffic controllers 12, and transmission requests are sent to the one or more traffic controllers 12. In an embodiment, a traffic controller 12 may be a Software-Defined Networking (SDN) controller. In an embodiment, a traffic controller 12 may be another type of network controller. In an embodiment, traffic controller 12 may route and schedule data according to the data transmission preferences specified by a user of device 200.

Each of nodes 100, 130, 140, and 150 may be interconnected with one or more cache nodes 16 by way of one or more data communication network. Each of nodes 100, 130, 140, and 150 may include one or more local caches 18. Caching nodes 16 and local caches 18 may each contain cached content data. The cached content data may, for example, be data accessed in the past by the particular user, or other users. The cached content data may, for example, be data frequently accessed e.g., in a particular geographic region or in a particular network 8. Nodes may search within cache nodes 16 and local caches 18 to identify content items of interest, or to find locations for identified content items. Content may be pre-fetched from any of these cache nodes 16 or local caches 18.

In an embodiment, each of nodes 100, 130, 140, and 150 may function as a virtualized version of mobile device 200, and present itself as mobile device 200 to network components, e.g., traffic controller 12. In one specific example, a node may present itself as mobile device 200 in order to obtain authorized access to network resources on behalf of mobile device 200. In another specific example, a node may track aspects of the state of mobile device 200, e.g., its power level, and distance from a power source. Such information may be used, for example, to change the priority of particular content data to be transmitted to the device.

In an embodiment, each of nodes 100, 130, 140, and 150 may be associated with other network functionalities, which may be assigned based on the level of that node in the hierarchy. For example, nodes 130 may function as regional connectivity managers, that facilitate tracking of a mobile device 200, and interact with traffic controller 12 on behalf of mobile device 200. For example, nodes 140 may function as local connectivity managers. Nodes 140 may also function as default gateways for the mobile device 200. So, node 140 may maintain data regarding future routing demands of device 200, e.g., based on content data that has been pre-fetched and is expected to be transmitted to device 200. Such routing demands may be provided to traffic controller 12.

Like nodes 150, nodes 130 and/or 140 may migrate with a particular user as the user moves from location to location.

In one specific example, a node 100 may be located in the cloud. A particular node 130 may be instantiated in the particular user's home city, e.g., at a regional gateway. A particular node 140 may be instantiated proximate the user's home, e.g., when the user is at home. Another node 140 may instantiated proximate the user's work, e.g., when the user is at work. When the user moves throughout the city, node 130 may be maintained in position, and new nodes 140 and 150 may be instantiated at various locations proximate to the user's changing locations. When the user leaves the city, e.g., by way of an airplane, a new node 130 may be instantiated, e.g., at a satellite, to serve the user while in transit. Nodes 140 and 150 may, for example, be instantiated within the airplane. When the user arrives at a new city, a new node 130 may be instantiated for the user in that new city. Similarly, new nodes 140 and 150 may also be instantiated for the user in the new city, and may migrate with the user's in that new city.

In an embodiment, a child node (e.g., a node 130, 140 or 150) may be instantiated at a location selected based on any of the factor listed for selection of subsets of pre-fetched content data to be sent to particular child nodes. So, a child node may be instantiated at a location selected based on one or more of the data transmission characteristics, the data transmission preferences, a predicted future location of the user, a geographic location of that child node to which the subset is sent, how soon content will be needed, quantity of content, traffic associated with other users, network security characteristics, content security requirements, etc.

Each of nodes 130, 140, 150 may be referred to herein as child nodes of root node 100. However, a node 140 may also be referred to as a child node of a nodes 130, and a grandchild node of root node 100. Similarly, a node 150 may also be referred to as a child node of a nodes 140, a grandchild node of a node 130, and a great grandchild node of root node 100. Conversely, each of nodes 100, 130, and 140 may be referred to as a parent node, grandparent node, or great grandparent node of their respective child nodes, grandchild nodes, and great grandchild nodes.

Nodes organized hierarchically into two levels and four levels have been shown in the depicted embodiments. However, in other embodiment, there may be a fewer or greater number of levels.

Further, in the depicted embodiments, the nodes are interconnected according to a tree topology. However, in other embodiments, the nodes may be interconnected according to a different topology (e.g., mesh topology). For example, each child node may be interconnected with multiple parent nodes, and may exchange data (e.g., content list updates, user mobility prediction updates, content data updates, etc.) with each of those parent nodes. Further, each child node may be interconnected with other child nodes at the same level of the hierarchy (e.g., its sibling nodes), such that data may be exchanged between child nodes. In an embodiment, the nodes of system 10 may be interconnected such that subsets of the nodes are arranged according to different topologies.

In some embodiments, information generated or obtained by system 10 or system 20, e.g., user mobility predictions, alternate locations of data, network transmission characteristics, when data is expected to be needed, etc., may be provided to traffic controller 12. Traffic controller 12 may take into account all such information to route and schedule data traffic.

In an embodiment, storage and transmission of content interests and content data may take into account security requirements, e.g., to protect confidential information or privacy. Such requirements may be specified, e.g., for each content item, or each type of content item. For example, a high level of security may be specified for content items including sensitive data such as, for example, personal photographs or bank statements. Conversely, a low level of security may be specified for publically available data such as, e.g., weather reports. Security requirements may be included in the content list, in association with particular content items.

Portions of content lists or content data may also be classified according to their purpose, e.g., personal or work, and different security requirements may be specified based on this purpose.

Portions of content lists or content data may be stored in particular locations and/or transmitted by way of particular links, depending on security requirements. For example, portions of content lists or content data associated with a user's work may be stored in a secured corporate server, and may be transmitted by way of secured VPN links.

In an embodiment, nodes may be instantiated at particular locations at least partly based on security requirements, e.g., using particular secured hardware or at particular secured network locations. In an embodiment, nodes may be instantiated at particular locations at least party based on network security characteristics, e.g., available secure protocols in different links and nodes in the network.

In an embodiment, subsets of content lists and/or subsets of content data may be selected at least partly based on security requirements, e.g., for transmission to particular secured hardware or to particular secured network locations. In an embodiment, subsets of content lists and/or subsets of content data may be selected at least partly based on the noted network security characteristics.

Content lists and content data may be encrypted during transmission and/or storage.

The operation of the data communication systems disclosed herein may be further described with reference to the flowcharts depicted in FIG. 7, FIG. 8, and FIG. 9.

Figure 7:
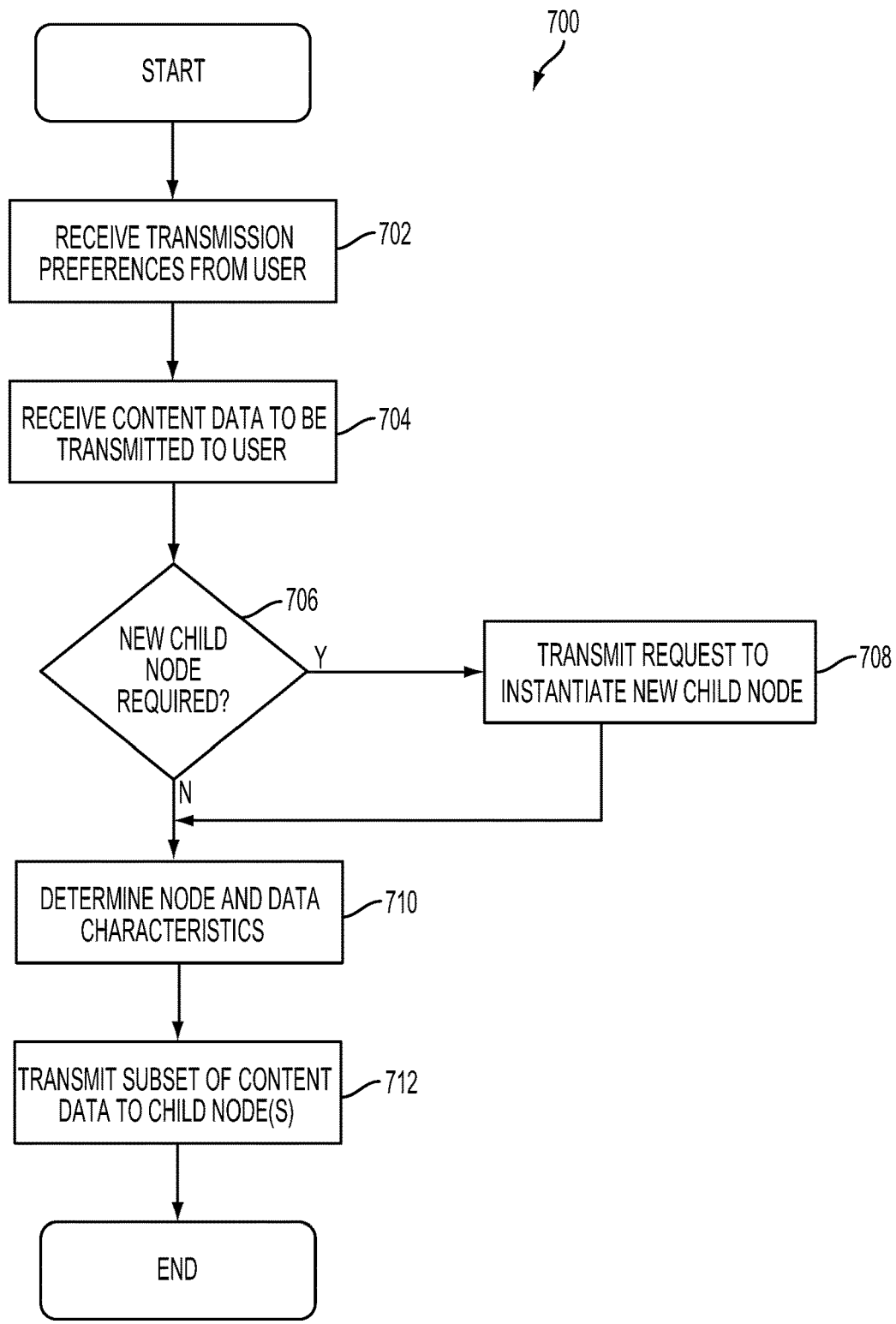
FIG. 7 is a flowchart showing example operation at a root node, exemplary of an embodiment.

FIG. 7 depicts example blocks 700 that may be performed at a root node 100. As will be appreciated, the order of the blocks is exemplary only, and blocks may be performed in other suitable orders.

As depicted, operation may begin at block 702. At block 702, root node 100 receives data transmission preferences for the user of mobile device 200, e.g., tolerance for transmission costs, latency requirements. At block 704, root node 100 receives content data to be transmitted to the user. For example, root node 100 may pre-fetch content data expected to be of interest to the particular user from at least one content source, e.g., by way of at least one network 8. The content data may also be data requested by the user of device 200.

At block 706, root node 100 may determine whether a new child node is required, e.g., based on a prediction of a future location of the user. A new child node may be required if there are no existing child nodes proximate the predicted future location.

If a new node is required, operation may proceed to block 708, and thereafter to block 710. Otherwise, if a new node is not required, operation may proceed directly to block 710.

At block 708, a desired geographic location of the new child node is selected based on the prediction of the future location of the user, e.g., to be proximate the predicted future location. Selection of the geographic location of the new child node is also based on the locations of devices available to function as the new child node. Root node 100 then causes a new child node to be instantiated at the selected geographic location. For example, root node 100 may transmit a request to a device at the selected geographic location to function as the new child node.

At block 710, root node 100 determines the data transmission characteristics of the child nodes, e.g., transmission costs, data rate, capacity, latency, etc. These characteristics may be received from each of the child nodes, or from monitors residing in a network 8. Root note 100 also determines the characteristics of the content data to be sent to the user, e.g., data type, urgency, size of content items.

At block 712, root node 100 determines a subset of the pre-fetched content data to be transmitted to one or more of the child nodes. The subset may be selected in the manners described above. For example, the subset to be sent to a child node may be selected based on at least a predicted future location of the user, and the geographic location of that child node. The subset to be sent to a child node may also be selected based on data transmission characteristics of the child nodes, as determined at block 710. The subset to be sent to a child node may also be selected based on the user's data transmission preferences, as received at block 702.

The selected subset(s) of the list of content items are then transmitted to the appropriate child node(s).

One or more of the blocks described above may be repeated at root node 100, e.g., as new content data needs to be sent to device 200.

Figure 8:
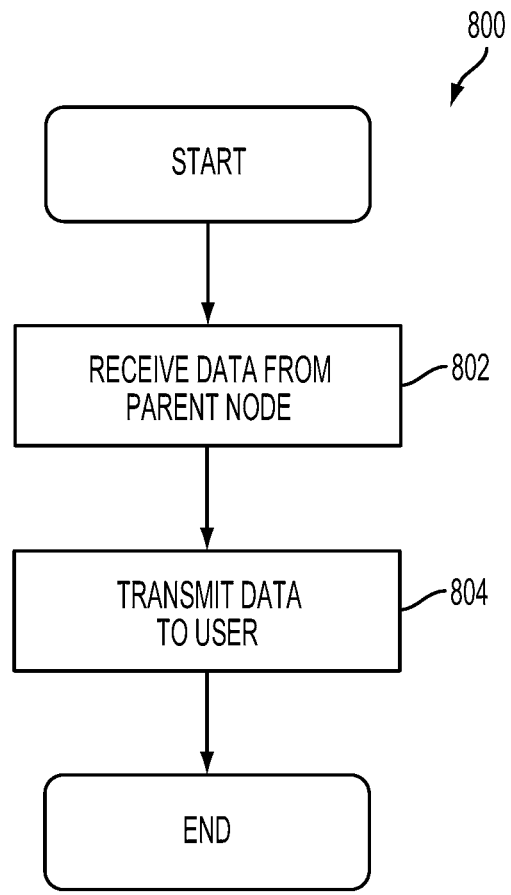
FIG. 8 is a flowchart showing example operation at a child node, exemplary of an embodiment.

FIG. 8 depicts example blocks that may be performed at a child node (e.g., a child node 130, 140, or 150). As depicted, operation may begin at block 802. At block 802, the child node receives content data from its root node (e.g., root node 100). The content data may, for example, be pre-fetched content data expected to be of interest to the user of device 200 or data requested by the user of device 200.

At block 804, some or all of the received data is transmitted to mobile device 200. Data that is not transmitted to mobile device 200 may be stored at the child node for later transmission.

One or more of the blocks described above may be repeated at the child node, e.g., as new content data is received from the parent node.

Figure 9:
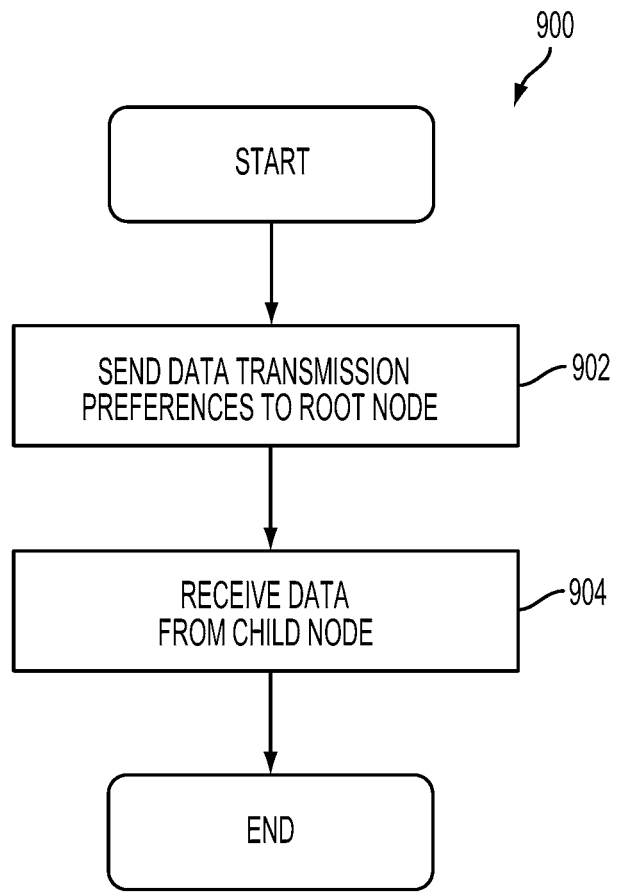
FIG. 9 is a flowchart showing example operation at a mobile device; exemplary of an embodiment.

FIG. 9 depicts example blocks that may be performed at mobile device 200. As depicted, operation may begin at block 902. At block 902, device 200 determines data transmission preferences for the user, or for particular applications executing at the device. These data transmission preferences are transmitted to the root node. The data transmission preferences may also be transmitted to a network controller, e.g., controller 12.

At block 904, the device requests content data from a child node 150 for immediate use or future use, and receives the requested content data from a child node 150. Transmission of this content data may satisfy at least some of the data transmission preferences determined at block 902.

As will be appreciated, the flowcharts depicted in FIG. 7, FIG. 8, and FIG. 9 show simplified example operation of the systems described herein, and other details (e.g., prediction of user situation, exchange of content list data, uploading of data, etc.) have been omitted for clarity. The systems may operate in these and other manners.

Although embodiments have been described in the foregoing with reference to mobile devices, the systems, methods and devices disclosed herein may be applied to all manner of devices, e.g., vehicle, robots, machines, sensors, televisions, desktop computers, etc. Such devices need not be mobile. Such devices may be integrated with other devices or equipment.

Although embodiments have been described in the foregoing with reference to example nodes having particular functionality, it will be appreciated that in some embodiments, the functionality described for one example node may be distributed over multiple nodes, which may each be implemented in hardware, software, or a combination thereof. In some embodiments, multiples nodes may be implemented using shared hardware or software.

Embodiments have been described in the foregoing with reference to a user. As will be appreciated, in some embodiments, the user need not be a human being. Rather, the user may, for example, be a device, a machine, or an software application.

In one specific example, the user may be a robot, and content of interest for the robot may relate to potential kinematic designs. Such content may be retrieved by the robot, for example, to plan upcoming movements.

In another specific example, the user may be a controller for an electronic billboard, and content of interest may be advertisements. Such content may be retrieved, for example, in response to the presence of particular users.

In another specific example, the user may be a controller for a self-driving vehicle, and content of interest may be road conditions. Such content may be retrieved, for example, to adapt to such road conditions.

Figure 10:
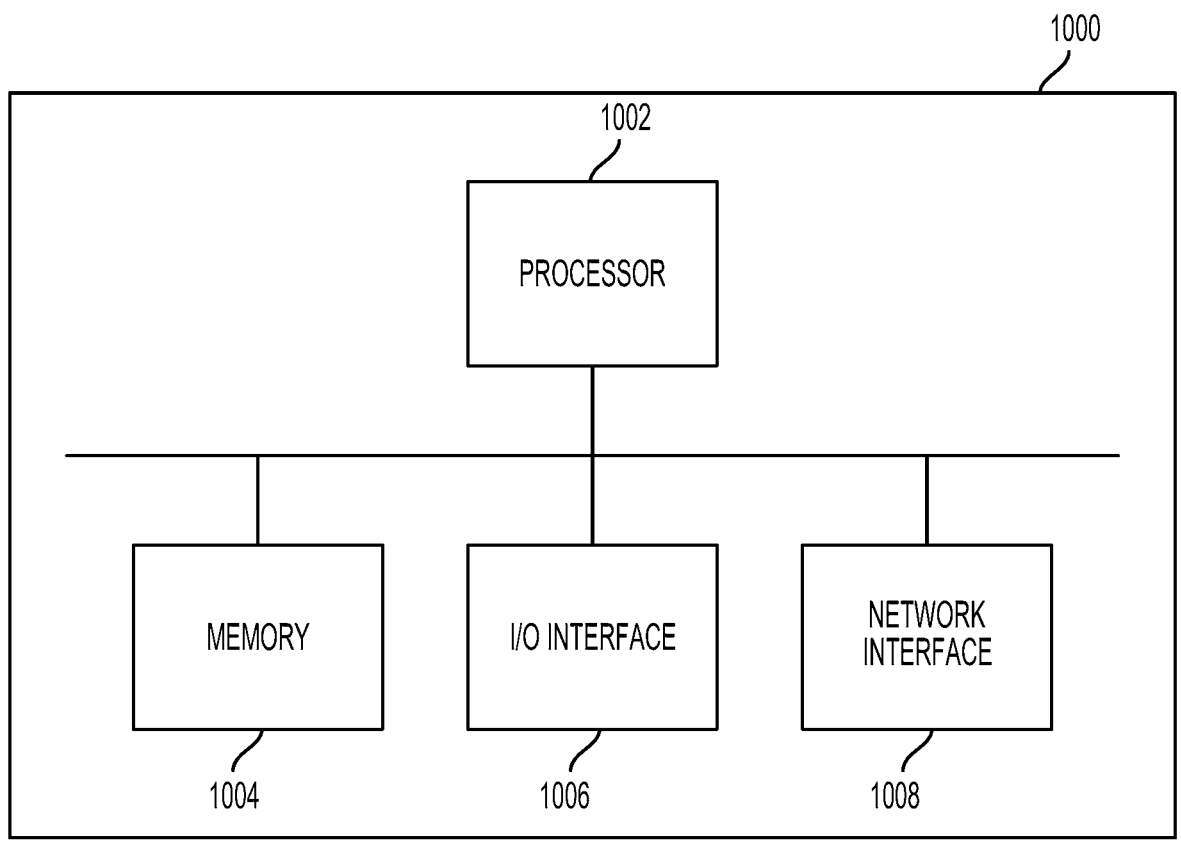
FIG. 10 is a high-level block diagram of an example device for implementing nodes, exemplary of an embodiment.

FIG. 10 is a schematic diagram of an example computing device 1000 that may be adapted to function as any of the nodes described herein. The computing device may be any network-enabled computing device such as, e.g., a server-class computer, or a personal computer, a router, a switch, an access point, etc. Computing device 1000 may also be adapted to function as mobile device 200.

In the depicted embodiment, computing device 1000 includes at least one processor 1002, memory 1004, at least one I/O interface 1006, and at least one network interface 1008.

Processor 1002 may be any type of processor, such as, for example, any type of general-purpose microprocessor or microcontroller (e.g., an Intel™ x86, PowerPC™, ARM™ processor, or the like), a digital signal processing (DSP) processor, an integrated circuit, a field programmable gate array (FPGA), or any combination thereof.

Memory 1004 may include a suitable combination of any type of computer memory that is located either internally or externally such as, for example, random-access memory (RAM), read-only memory (ROM), compact disc read-only memory (CDROM), electro-optical memory, magneto-optical memory, erasable programmable read-only memory (EPROM), and electrically-erasable programmable read-only memory (EEPROM), or the like.

I/O interface 1006 enables device 1000 to interconnect with input and output devices, e.g., peripheral devices or external storage devices.

Network interface 1008 enables device 1000 to communicate with other components, e.g., other nodes, and perform other computing applications by connecting to a network such as one or more of networks 8.

Embodiments disclosed herein may be implemented by using hardware only or by using software and a necessary universal hardware platform. Based on such understandings, the technical solution may be embodied in the form of a software product. The software product may be stored in a non-volatile or non-transitory storage medium, which can be a compact disk read-only memory (CD-ROM), USB flash disk, a solid-state drive or a removable hard disk. The software product includes a number of instructions that enable a computer device (personal computer, server, or network device) to execute the methods provided in the embodiments.

Program code, which may be stored in memory 1004, may be applied to input data to perform the functions described herein and to generate output information. The output information may be applied to one or more output devices. In some embodiments, the communication interface with such output devices may be a network communication interface (e.g., interface 1008). In embodiments in which elements may be combined, the communication interface may be a software communication interface, such as those for inter-process communication. In still other embodiments, there may be a combination of communication interfaces implemented as hardware, software, and combination thereof.

Each computer program may be stored on a storage media or a device (e.g., ROM, magnetic disk, optical disc, solid-state drive), readable by a general or special purpose programmable computer, for configuring and operating the computer when the storage media or device is read by the computer to perform the procedures described herein. Embodiments of the system may also be considered to be implemented as a non-transitory computer-readable storage medium, configured with a computer program, where the storage medium so configured causes a computer to operate in a specific and predefined manner to perform the functions described herein.

Furthermore, the systems and methods of the described embodiments are capable of being distributed in a computer program product including a physical, non-transitory computer readable medium that bears computer usable instructions for one or more processors. The medium may be provided in various forms, including one or more diskettes, compact disks, tapes, chips, magnetic and electronic storage media, volatile memory, non-volatile memory and the like. Non-transitory computer-readable media may include all computer-readable media, with the exception being a transitory, propagating signal. The term non-transitory is not intended to exclude computer readable media such as primary memory, volatile memory, RAM and so on, where the data stored thereon may only be temporarily stored. The computer useable instructions may also be in various forms, including compiled and non-compiled code.

It will be noted that servers, services, interfaces, portals, platforms, or other systems formed from hardware devices can be used. It should be appreciated that the use of such terms is deemed to represent one or more devices having at least one processor configured to execute software instructions stored on a computer readable tangible, non-transitory medium. One should further appreciate the disclosed computer-based algorithms, processes, methods, or other types of instruction sets can be embodied as a computer program product comprising a non-transitory, tangible computer readable media storing the instructions that cause a processor to execute the disclosed steps.

As used herein, and unless the context dictates otherwise, the term "coupled to" is intended to include both direct coupling (in which two elements that are coupled to each other contact each other) and indirect coupling (in which at least one additional element is located between the two elements). Therefore, the terms "coupled to" and "coupled with" are used synonymously.

The embodiments described herein are implemented by physical computer hardware embodiments. The embodiments described herein provide useful physical machines and particularly configured computer hardware arrangements of computing devices, servers, processors, memory, networks, for example. The embodiments described herein, for example, are directed to computer apparatuses, and methods implemented by computers through the processing and transformation of electronic data signals.

The embodiments described herein may involve computing devices, servers, receivers, transmitters, processors, memory, display, networks particularly configured to implement various acts. The embodiments described herein are directed to electronic machines adapted for processing and transforming electromagnetic signals which represent various types of information. The embodiments described herein pervasively and integrally relate to machines, and their uses; and the embodiments described herein have no meaning or practical applicability outside their use with computer hardware, machines, a various hardware components.

Substituting the computing devices, servers, receivers, transmitters, processors, memory, display, networks particularly configured to implement various acts for non-physical hardware, using mental steps for example, may substantially affect the way the embodiments work.

Such hardware limitations are clearly essential elements of the embodiments described herein, and they cannot be omitted or substituted for mental means without having a material effect on the operation and structure of the embodiments described herein. The hardware is essential to the embodiments described herein and is not merely used to perform steps expeditiously and in an efficient manner.

Although the present invention and its advantages have been described in detail, it should be understood that various changes, substitutions and alterations can be made herein without departing from the invention as defined by the appended claims.

Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

As can be understood, the examples described above and illustrated are intended to be exemplary only. The scope is indicated by the appended claims.

What is claimed is:

1. A method comprising:
   receiving, by a node of a communication network, data transmission preferences associated with a particular user of the mobile device;
   requesting, by the node, content data for one or more content items expected to be of interest to the particular user sent by at least one content source;
   receiving by the node, the content data for the one or more content item expected to be of interest to the particular user;
   assigning, by the node, a priority each of the one or more content items expected to be of interest to the particular user;
   storing, by the node, the content data for one or more content items expected to be of interest to the particular user associated with the mobile device;
   selecting, by the node, one or more other nodes of the communication network distributed geographically at locations proximate a predicted geographic location of a mobile device associated with the user based the data transmission preferences associated with the particular user and data transmission characteristics of communication with each of the one or more other nodes;
   selecting, by the node, at least one of the one or more content items for transmission to the one or more other nodes based on one or more of: the predicted future geographic location, the geographic location of each of the one or more other nodes, the data transmission characteristics for each of the other nodes, and the priority assigned to each of the one or more content items expected to be of interest to the particular user; and
   transmitting, by the node, the content data for the at least one or more content items to the one or more other nodes of the communication network.

2. The method of claim 1, further comprising:
   determining whether a new child node for the communication network is required based on the predicted geographic location of the mobile device;
   after determining that the new child node is required, transmitting, by the node, a request to a device located at the selected geographic location to function as the new child node, the device being an existing networked device which is available to function as the new child node, the new child node being subsequently selected as one of the one or more other nodes.

3. The method of claim 1, further comprising:
   receiving, by the node, the data transmission characteristics of communication with each of the one or more other nodes; and
   wherein selecting the one or more other nodes is further based on a geographic location of each of the one or more other nodes.

4. The method of claim 1, wherein the data transmission characteristics of communication with each of the one or more other nodes comprise transmission costs, data rate, capacity, or latency.

5. The method of claim 1, further comprising, prior to requesting:
   performing, by the node, content interest prediction to identify the one or more content items expected to be of interest to the particular user of the mobile device; and
   storing, by the node, a content list comprising the one or more content items.

6. The method of claim 5, further comprising:
   transmitting, by the node, a request to the at least one content source of the communication network to send content data for each of the one or more content items expected to be of interest to the particular user.

7. The method of claim 5, wherein performing, by the node, content interest prediction comprises processing data reflective of past consumption of the content data for the one or more content items included in the content list by the particular user or data reflective of current consumption of the content data for the one or more content items included in the content list by the particular user.

8. The method of claim 5, wherein performing, by the node, content interest prediction comprises processing data reflective of consumption behaviour of a population of users of the content data for the one or more content items expected to be of interest to the particular user.

9. The method of claim 1, wherein the priority of each of the one or more content items expected to be of interest to the particular user is determined based on the predicted future locations of the mobile device associated with the particular user.

10. The method of claim 1, wherein assigning comprises assigning a priority to each of the one or more content items expected to be of interest to the particular user based on one of: a mobility prediction for the mobile device associated with the particular user; a likelihood that the user of the mobile device will access the content data for a particular content item at a particular location; and the data transmission preferences for the particular user.

11. A method comprising:
    transmitting, by a mobile device associated with a user, a content interest list determined for a user associated with the mobile device to a node of a communication network located at a geographic location proximate a geographic location of the mobile device, wherein the content interest list includes one or more content items expected to be of interest to the user, and wherein each of the one or more content items is assigned a priority according to one or more of: a predicted future geographic location of the mobile device; a geographic location of the node; and data transmission characteristics for the node;
    receiving, by the mobile device, a data transmission from the node, the data transmission comprising content data for at least one of the one or more of content items in the content interest list, wherein the content data for at least one of the one or more of content items is sent by a content service provider to the node via another root node of the communication network, wherein the at least one of one or more content items received from the node are sent by the node to the mobile device in an order which satisfies the priority assigned to each of the one or more content items indicated in the content interest list determined for the user associated with mobile device.

12. The method of claim 11, wherein the content interest list is determined based on applications executing at the mobile device.

13. The method of claim 11, further comprising:
predicting, by the mobile device, one or more future geographic locations of the mobile device associated with the user; and
transmitting, by the mobile device, the predicted one or more future geographic locations to the node.

14. The method of claim 11, further comprising:
predicting, by the mobile device, the one or more content items expected to be of interest to the user of the mobile device.

15. The method of claim 14, wherein predicting comprises processing data reflective of past consumption of the content data for the one or more content items expected to be of interest to the user associated with the mobile device or data reflective of current consumption of the content data for the one or more content items expected to be of interest to the user associated with the mobile device.

16. The method of claim 14, wherein predicting comprises processing data reflective of consumption behaviour of a population of users of the content data for the one or more content items expected to be of interest to the user associated with the mobile device.

17. The method of claim 11, further comprising receiving from the node an updated list of content expected to be of interest to the user, and updating the content interest list according to the received updated list.

18. A method comprising:
receiving, by a node of a communication network, data transmission preferences associated with a particular user of the mobile device;
requesting, by the node, content data for one or more content items expected to be of interest to the particular user sent by at least one content source;
receiving by the node, the content data for the one or more content item expected to be of interest to the particular user;
storing, by the node, the content data for one or more content items expected to be of interest to the particular user associated with the mobile device;
analyzing the content data for each of the one or more content items expected to be of interest to the particular user to determine a characteristic of the content data for each of the one or more content items expected to be of interest to the particular use;
selecting, by the node, one or more other nodes of the communication network distributed geographically at locations proximate a predicted geographic location of a mobile device associated with the user based the data transmission preferences associated with the particular user and data transmission characteristics of communication with each of the one or more other nodes;
selecting, by the node, at least one of the one or more content items expected to be of interest to the particular user for transmission to the one or more nodes, wherein said selecting of the at least one of the one or more content items is based on the data transmission preferences associated with the particular user, the data transmission characteristics of the one other node, and the characteristic of the content data for each of the one or more content items expected to be of interest to the particular user; and
transmitting, by the node, the content data for the at least one or more content items to the one or more other nodes of the communication network.

19. The method of claim 18, wherein the characteristic of the content data for each respective content item includes a size of the content data for the respective content item, urgency of the respective content item, and a data type of the content data for the respective content item.

* * * * *